United States Patent [19]
Jurrius et al.

[11] Patent Number: 5,616,199
[45] Date of Patent: Apr. 1, 1997

[54] APPARATUS FOR ELECTRONICALLY SEAM FUSING SIMILAR AND DISSIMILAR POLYMERIC MATERIALS

[75] Inventors: Eran J. P. Jurrius; Robert L. Karam, Jr., both of Akron, Ohio

[73] Assignee: Enclosure Technologies, Inc., Akron, Ohio

[21] Appl. No.: 463,025

[22] Filed: Jun. 5, 1995

Related U.S. Application Data

[63] Continuation-in-part of Ser. No. 273,091, Jul. 8, 1994, Pat. No. 5,472,549.

[51] Int. Cl.$^6$ ........................................... C09J 5/00
[52] U.S. Cl. ..................... 156/64; 156/311; 156/359; 156/498; 156/583.2; 156/583.4; 219/243
[58] Field of Search ........................... 156/64, 311, 358, 156/359, 498, 583.1, 583.2, 583.3, 583.4; 219/243, 477, 483; 53/370.7, 373.7, 375.9, 377.7

[56] References Cited

U.S. PATENT DOCUMENTS

| | | | |
|---|---|---|---|
| 3,442,732 | 5/1969 | Robbins et al. | 156/64 |
| 3,743,562 | 7/1973 | Phipps | 156/64 |
| 3,964,958 | 6/1976 | Johnston | 156/583.3 |
| 4,108,712 | 8/1978 | Bala et al. | 156/583.2 |
| 4,355,076 | 10/1982 | Gash . | |
| 4,735,675 | 4/1988 | Metz | 219/243 |
| 4,806,411 | 2/1989 | Mattingly, III et al. | 428/139 |
| 4,889,522 | 12/1989 | Gietman, Jr. | 219/243 |
| 4,923,556 | 5/1990 | Kettelhoit et al. | 219/243 |
| 4,946,432 | 8/1990 | Susini et al. | 219/243 |
| 5,110,381 | 5/1992 | Heckard et al. | 156/64 |
| 5,219,498 | 6/1993 | Keller et al. | 156/64 |
| 5,246,325 | 9/1993 | Morishige et al. | 156/359 |
| 5,322,586 | 6/1994 | McLean | 156/358 |
| 5,427,645 | 6/1995 | Lovin | 156/367 |

*Primary Examiner*—Neil McCarthy
*Assistant Examiner*—Theodore M. Green
*Attorney, Agent, or Firm*—Renner, Kenner, Greive, Bobak, Taylor & Weber

[57] ABSTRACT

A device for electronically seam fusing similar or dissimilar multiple polymeric materials by placing the materials between two opposing plates, wherein the plates have cooling tubes disposed within the plates and have the required combination of heating elements, non-stick heat barriers, and configuration enhancers disposed thereon. The opposing plates are then closed by a force which is regulated by a control feature which also governs the timing, length and temperature that is utilized by the heat elements and cooling tubes of the invention. Upon completion of the electronic seam fuse cycle, the multiple layers of polymeric materials are fused together, and separated if desired, thus creating a seam that is as strong or stronger than the individual material. The selection of seam fusing process parameters is determined by employing an optimization process that considers the impact each process parameter has in combination with one another. This ensures that desired output characteristics such as seam strength are obtained.

17 Claims, 13 Drawing Sheets

APPARATUS FOR ELECTRONICALLY SEAM FUSING SIMILAR AND DISSIMILAR POLYMERIC MATERIALS

CROSS REFERENCE TO RELATED APPLICATION

This is a continuation-in-part of patent application Ser. No. 08/273,091 filed Jul. 8, 1994, now U.S. Pat. No. 5,472,549, for Apparatus for Electronically Seam Fusing Similar and Dissimilar Materials.

TECHNICAL FIELD

The invention herein resides in the art of seam fusing materials and in particular electronically seam fusing polymeric materials. Specifically, the invention relates to electronically seam fusing multiple similar or dissimilar polymeric materials to form a melt bond that preserves the molecular structure of the dissimilar materials so that the bonded area is stronger than the materials themselves. Additionally, the present invention relates to an optimization process for determining the ideal manufacturing parameters for seam fusing dissimilar polymeric materials.

BACKGROUND ART

People have sought facile and reliable means to join flat flexible materials together to form such items as clothing, enclosures, bags, tents, balloons and the like. Early civilizations used crude forms of needles and threads to join materials together. More recently, sewing machines have provided a fast and reliable means to join two or more materials together. Sewing machines are known to provide a secure attachment between materials that is very strong and pleasing to the eyes. With the advent of adhesives, flat flexible materials can now be glued together to achieve a secure bond. One advantage that adhesives have over sewing is that a gas-tight and water-proof seal may be achieved. This type of seal is especially useful in the storage of food and in the manufacture of water-proof clothing. Unfortunately, adhesive type seals will degrade over a period of time and may break due to fluctuations in temperature and physical stress at the seal. Normal sewing techniques may provide a stronger connection between two materials; however the needle will leave pin holes in the material thus preventing the possibility of a gas tight seal.

With the introduction of thermoplastic and polymeric materials, attempts have been made to fuse two or more of these type materials together by applying pressure to the areas desired to be joined, and then applying heat to those pressure points until the materials melt together, creating a melt bond. Melt bonds provide a good seal that is gas-tight and water proof and has a reasonable amount of strength associated therewith. However, unless precise controls are maintained with respect to the fusing process variables, a poor seam may result. For example, if uneven pressure is applied to the materials to be fused, a weak or intermittent seal will be created, thereby affecting the quality of the seal.

Prior art has attempted to control the many variables involved in seam fusing thermoplastic materials together. In particular, U.S. Pat. No. 4,555,293 by French teaches the use of equipment that requires selecting the proper dimensions for the heating elements to be placed in a specific type die, the die being mateable with a matching recess in an opposite die, wherein the dimensions of the heating elements, recess and mating dies must be correlated to the thickness and compression characteristics of the thermoplastic sheet material to be bonded. Although useful, the French patent is limited in several respects.

In particular, the French patent only discloses the ability to thermobond two similar thermoplastic materials together. Additionally, the French apparatus is limited in only bonding thermoplastic materials, whereas the present invention is able to bond dissimilar polymeric materials together.

Those skilled in the art will appreciate that a thermoplastic material is limited to those materials having the property of softening when heated and becoming rigid again when cooled, without undergoing any appreciable chemical change to the material itself. In contrast, a polymeric material, of which thermoplastic material is a subset, is classified as a natural or synthetic chemical compound or mixture of compounds formed by a chemical reaction in which two or more small molecules that contain repeating structural units of the original molecules and that have the same percentage composition as the small molecules are lined together to form a stable material. Some polymeric materials, such as rubber, will undergo appreciable chemical change if heated past their melting points and then cooled. A polymeric material can either be woven, like a cloth, or non-woven, like a film.

A further disadvantage of current thermoplastic bonding machines is that inconsistent seam strength seals are generated. In other words, current seam fusing processes employ imprecise control systems which provide packages with inconsistent seam strength. For example, when opening a bag of potato chips at a top seam, the seam usually pulls open along its length and does not tear down the side. However, inconsistent seam strength may force the consumer to pull harder on the top seam and inadvertently tear open the side of the package, thereby spilling the contents. This problem is averted by more precisely controlling the seam strength.

An additional drawback of current thermoplastic bonding machines is that the heating element used to seam the food container is heated at a constant temperature throughout the packaging process. As such, this heat migrates to the contents of the package and creates undesired food deposits along the length of the area to be seamed. As such, leaks within the package are more likely to occur, thereby spoiling the contents of the package more quickly.

It will also be appreciated that current packaging materials require polymeric materials with multiple dissimilar layers of polymeric material to achieve the various properties of a good package. For example, one layer of material is typically used to create an air tight seal, while other layers are employed to provide structural strength and integrity to the package. Unfortunately, these multiple layer materials are expensive and, if improperly sealed, do not perform to the required expectations.

Accordingly, there is a need in the art for an apparatus and method for electronically seam fusing multiple layers of dissimilar polymeric materials to form a molecular bond that is stronger than the individual materials. Furthermore, there is a need in the art for an apparatus and method for electronically seam fusing multiple layers of dissimilar polymeric materials that provide a consistent seam strength and that can reduce the expense of using multiple polymeric layered materials.

DISCLOSURE OF INVENTION

In light of the foregoing, it is a first aspect of the invention to provide an apparatus for electronically seam fusing multiple dissimilar polymeric materials.

It is another aspect of the present invention to electronically seam fuse multiple dissimilar polymeric materials to create a molecular bond among the dissimilar materials such that the bond is stronger than the material itself.

It is yet another aspect of the present invention to provide an electronically seam fused bond that is aesthetically pleasing, superior in strength and cost effective when compared with other fastening or sealing procedures.

It is still another aspect of the present invention to provide a method for electronically seam fusing multiple dissimilar polymeric materials.

It is a further aspect of the present invention to provide a method for electronically seam fusing multiple dissimilar polymeric materials where the functions of applying pressure, heating, cooling, and dwell time are controlled electronically.

It is still another aspect of the present invention to electronically seam fuse two adjacent seals, with a tear region in between so that when the two adjacent seals are separated they will remain intact.

Another aspect of the present invention is to provide an apparatus wherein the functions of applying pressure cooling, heating and dwell time are controlled independently of each other.

A further aspect of the present invention is to provide a sealing apparatus that can easily be configured into any shape desired.

Yet another aspect of the present invention is to provide an apparatus for electronically seam fusing multiple dissimilar materials wherein the ideal process parameters are determined by an optimization process.

It is still another aspect of the present invention to provide an optimization method for electronically seam fusing polymeric materials, wherein the optimization process considers any number of process parameters and their impact upon each other, including but not limited to temperature, clamp pressure, amount of power, the cycling of power, dwell time, cooling, the shape of the material to be fused, the type of material, and the clamp impact force.

Another aspect of the present invention is to provide an optimization process for electronically seam fusing multiple dissimilar materials, wherein the optimization process considers the desired output characteristics and their impact on each other, including but not limited to seam strength, desired seam tear characteristics, the completeness of the seal, cutting characteristics of the polymeric materials and shelf life of the seamed package.

It is yet another aspect of the present invention to electronically seam fuse like layers of separate polymeric materials to one another, for example wherein the polymeric material is made up of layers of polyester, polyethylene and linear low density polyethylene.

It is a further aspect of the present invention to provide an electronic seam fusing device which provides repeatably consistent seam strengths without damaging the contents of the package and which provides a cost savings in material as more simplified types of layered polymeric materials can be used.

At least one or more of the foregoing objects, together with the advantages thereof over the known art relating to seam fusing devices, which shall become apparent from the specification which follows, are accomplished by the invention as hereinafter described and claimed.

The foregoing and other aspects of the invention which shall become apparent as the detailed description proceeds are achieved by a method for optimizing process parameters for electronically seam fusing polymeric materials which comprises the steps of: set in preliminary process parameters for a plurality of polymeric materials; estimating a range of preliminary process parameters for the plurality of polymeric materials; designing a test run employing the plurality of polymeric materials and the range of preliminary process parameters; performing the test run so as to obtain output data; analyzing statistically the output data with respect to a plurality of combinations of the range of preliminary process parameters; identifying optimum process parameters for the plurality of polymeric materials; and seam fusing the polymeric materials with the optimum process parameters.

The present invention also provides a method for seam fusing polymeric materials which comprises the steps of: inserting two like pieces of polymeric material between first and second plates, wherein each piece of polymeric material has at least three dissimilar layers of polymeric material; closing the first and second plates upon the polymeric materials; providing at least one heating element disposed on one of the first and second plates; raising the temperature of the heating element to a first temperature to fuse one of the layers of both polymeric materials; raising the temperature of the heating element to a second temperature to fuse one of the remaining layers of both polymeric materials; raising the temperature of the heating element to a third temperature to melt the remaining layer of polymeric materials; opening the first and second plates; and removing the seam fused materials.

The present invention further provides an apparatus for electronically seam fusing dissimilar polymeric materials, comprising: a first plate having a first heating means; a second plate spaced apart from said first plate and defining an opening therebetween for receiving like polymeric materials therein, wherein said like polymeric materials have at least two dissimilar layers of polymeric material; and control means for selectively activating and cycling said first heating means to distinct temperature ranges within distinct corresponding predetermined periods of time, wherein said distinct temperature ranges and said distinct periods of time correspond to the number and type of said dissimilar layers within said like polymeric materials for the fusing of said dissimilar layers to each like dissimilar layer.

BEST MODE FOR CARRYING OUT THE INVENTION

Figure 1:
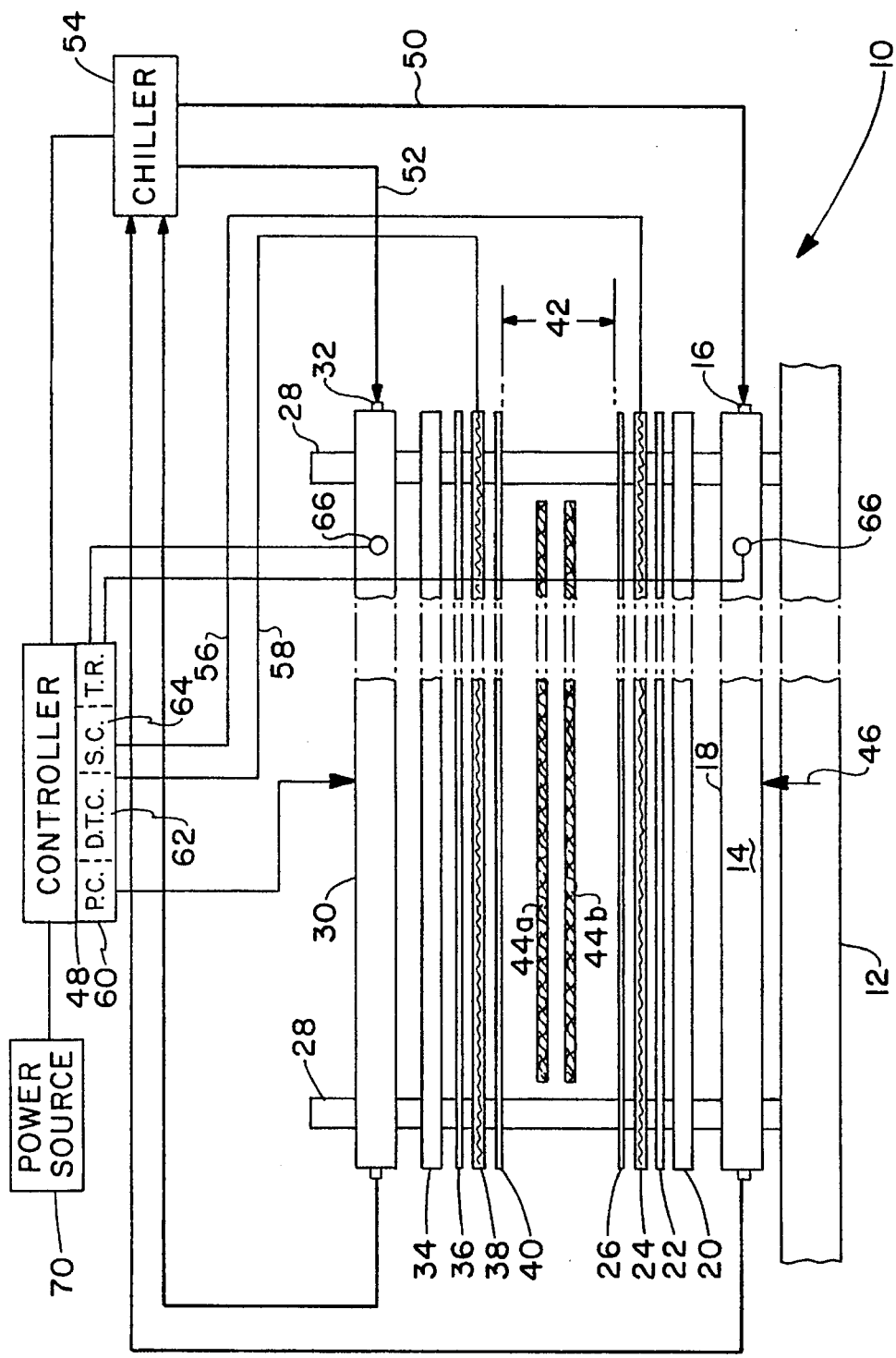
FIG. 1 is an elevational view diagrammatically illustrating an apparatus for electronically seam fusing similar and dissimilar polymeric materials.

Referring now to the drawings and more particularly to FIG. 1, it can be seen that an apparatus for electronically seam fusing similar and dissimilar polymeric materials is designated generally by the numeral 10. The device includes a base 12 which supports a plate 14 having a cooling tube 16 disposed therein and having a surface opposite the base 12 designated as a material side 18. Disposed on the material side 18 is a configuration enhancer 20, which has disposed thereon a primary heat barrier 22, a heating element 24, and a secondary heat barrier 26. A minimum of one, but preferably a plurality of alignment posts 28 may be mountably secured to said base 12, with the plate 14 slidably mounted to the posts.

Spaced apart from and opposed to the first plate 14 is a corresponding plate 30. In a construction similar to the plate 14, the corresponding plate 30 has a cooling tube 32 disposed therein. Disposed on the side of the corresponding plate 30 facing the plate 14, will be a configuration enhancer 34, a primary heat barrier 36, a heating element 38, and a secondary heat barrier 40.

As those skilled in the art can appreciate, the area between the plate 14 and the plate 30 forms an opening 42. Multiple dissimilar or similar polymeric materials 44 are disposed within the opening 42. A closure force 46 is then applied to the plate 14 and the plate 30 to hold the materials 44 while they are being fused. A system of controls 48 governs the amount of pressure applied and the length of time the closure force 46 is engaged upon the materials 44.

While the closure force 46 is being applied to the materials 44, the controls 48 simultaneously regulate a cooling tube flow 50 to the cooling tube 16, and a cooling tube flow 52 to the cooling tube 32. A chiller 54, regulated by the controls 48, regulates the flow and the temperature of coolant to the tubes 16 and 32. Usually, the coolant contained within the tubes 16 and 32 will comprise a polyglycol/ water mixture or 100% polyglycol. Other similar type substances may be used to obtain the cooling temperature desired. Additionally, the controls 48 simultaneously regulate a heat flow 56 to the heat element 24, and a heat flow 58 to the heat means 38. As implied earlier, the controls 48 contain a pressure controller 60, a dwell time controller 62, and a start cycle button 64. A temperature sensor 66 is located on each plate 14 and 30 and is operatively connected to the controls 48 to further regulate the temperature at the plates. The controls 48, and thus the seam fuser 10, are operatively powered by a power source 70.

As those skilled in the art can appreciate, the plate 30 is slidably mounted to the alignment post 28 such that when the closure force 46 is applied to the polymer materials 44, the plate 14 and the plate 30 are properly aligned so that the correct pressures and temperatures may be applied.

Referring now to FIGS. 2 A–H, those skilled in the art will appreciate that various types of heating elements may be used to properly perform the heat fusing of the dissimilar polymeric materials. FIG. 2A illustrates a wire heating element which may be disposed on either the primary heat barrier 22 or 36 or on the configuration enhancers 20 or 34. Furthermore, a secondary heat barrier 26 or 40 may be disposed over the wire. The wire heating element 24, 38 may also be varied with respect to its diameter and type of material. Typically, the wire heating element 24, 38 is a nichrome material or other similar material that can be heated and cooled very quickly. As those skilled in the art will appreciate, the heating elements are inductively heated, that is the temperature of the element is raised or lowered by increasing or decreasing the amount of current conducted through the element. Accordingly, the heating elements are made up of a metal alloy that can repeatedly withstand large swings in temperature without undergoing elongation or deformation so as to adversely affect the integrity of the seam fusing process.

Figure 2A:
FIGS. 2A–H illustrate some of the possible combinations of heating elements that may be utilized in the apparatus for electronically seam fusing.
Figure 2B:
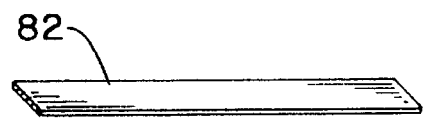

Instead of using a wire element, the types of dissimilar polymeric materials to be fused may require the use of a ribbon type heating element 82, as shown in FIG. 2B. As indicated earlier with the wire element 80, the ribbon element 82 may be used in conjunction with either configuration enhancer 20 or 34 or with the primary and secondary heat barriers 22, 36, 26, or 40.

Figure 2C:
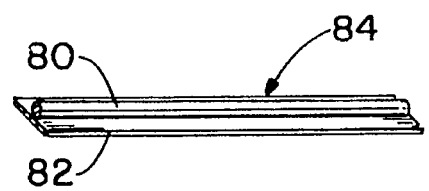
Figure 2D:
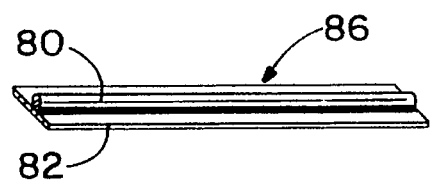
Figure 2E:
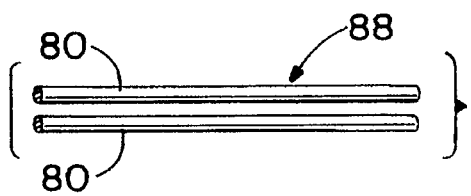
Figure 2F:
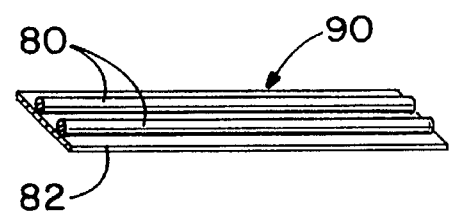
Figure 2G:
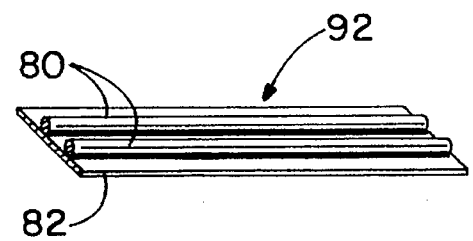
Figure 2H:
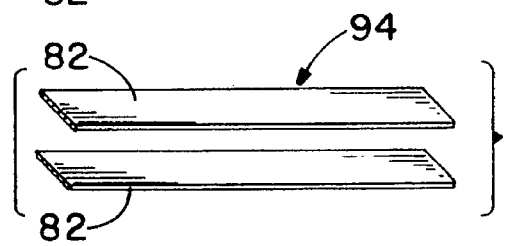

Furthermore, depending on the materials to be fused and configuration desired, the heating elements 24 or 38 may be made up of any combination of wires and ribbons. For example, FIG. 2C illustrates a wire 80 loosely placed on a ribbon 82, the configuration being generally designated as 84. If required by the dissimilar materials, the wire 80 may be brazed or soldered to the ribbon element 82 as shown in FIG. 2D as configured 86. Other combinations include, but are not limited to multiple wires 80 (FIG. 2E) shown as 88, multiple wires 80 loosely disposed on a ribbon 82 (FIG. 2F) shown as 90, multiple wires 80 brazed or soldered to a ribbon 82 (FIG. 2G) shown as 92 or multiple ribbons (FIG. 2H) shown as configuration 94.

In addition to the heating elements 24 or 38 being made up from any type of combination of wires 80 or ribbons 82, the heating elements may be configured in any three dimensional shape that is required for the desired application. For example, the heating element may be configured in the shape of a glove or a coverall suit. Also, if the application requires that an intermittent seal be created, the heating means may be configured as such. Typically, the various heating configurations shown in FIG. 2 will be utilized to create the desired seal.

Therefore, in actual operation, the dissimilar polymeric materials 44 are placed into the opening 42 between the plates 14 and 30. Depending upon the finished requirements of the seal, the materials may be held tautly or loosely in the opening. Following this, the operator of the apparatus activates it by pressing the start cycle button 64. This activates the closure force 46, thus drawing the two plates 14 and 30 together to secure the materials 44 within the apparatus. The pressure controller 60 will apply just enough force to ensure that the heating elements 24 and 38 along with the cooling elements 16 and 32 are in their required position. The closure may be effected by any of numerous means, such as pneumatic or hydraulic pistons, solenoids, worm screws, or the like.

The configuration enhancers 20 and 34 are usually a pliant material that provides total surface contact between the polymeric materials and the heating elements and/or the cooling elements to allow effective application of a preselected seam fusing program. Typically, the material used as a configuration enhancer will have a very high heat resistance with a soft durometer such as foam silicon rubber, although other similar materials may be used. The total surface contact of the configuration enhancers 20 and 34 ensures that there is an even distribution of heat and pressure to the materials to be fused. Depending upon the requirements of the application, it is possible that only one configuration enhancer will be disposed on only one of the plates.

Prior to the closure force 46 being effected by the controls 48, the controls activate the chiller 54 to direct the cooling flow 50 and 52 into the cooling tubes 16 and 32 respectively. The cooling temperature will be set at a predetermined level prior to the heating cycle being engaged. Once the heating cycle is engaged, the controls 48 then reduce the amount of cooling flow until the heat cycle is over. At this time, the cooling flow is controlled so as to be synchronous with the curing curve of the polymer material or film being seam fused. It is very important for the cooling tubes 16 and 32 to be in close proximity to the heating elements 24 and 38 to ensure that a proper seam fuse of the polymeric materials is realized. To ensure that the proper cooling temperature is maintained within the cooling tubes 16 and 36, input from the temperature sensors 66 will provide input to the controls 48. It should be noted that the cooling mechanism will only be used as required by the materials 44 to be fused. Therefore, it is conceivable that both cooling tubes 16 and 32 could be utilized or that both could be disengaged. Also, only one of the cooling tubes 16 or 32 in either plate 14 or 30 could be operated.

Typically, the heating cycle will only be engaged once the pressure controller 62 and the cooling temperatures have reached their predetermined levels. The temperatures of the heating cycle are based upon several factors. In particular, the heating, cooling and curing characteristics of the materials to be fused are critical in controlling the fusing process. It should be noted that polymeric materials have a first softening temperature where the material starts to become deformable, and a second higher melt temperature at which the material melts such that it can be molecularly cross-linked and fused with similar or dissimilar materials. Two dissimilar materials such as a nylon 44a and a polyethylene 44b will have correspondingly different characteristic softening and melting temperatures. For example, nylon 44a softens at about 316° F. and melts at about 320° F., while polyethylene 44b softens at about 195° F. and melts at about 215° F. It will be appreciated that in this example and the examples to follow that when a polymeric material is employed it is to be considered as a general type and not from a specific formula.

Therefore, to effectively seam fuse dissimilar materials, the controls 48 first pre-heat the elements 24 and 38 to a temperature at or below the lowest softening temperature of the material requiring the least amount of heat. The controls 48 are programmed so that the heating elements will first rise to a preheat level that is at a point at or below the lowest softening point temperature. In the case of seam fusing nylon 44a and polyethylene 44b, this temperature will be at or below 195° F. for polyethylene 44b. To form a pure melt bond, the heating element 38 is then very quickly raised to the highest temperature required, which in this case is 320° F. to melt the nylon 44a, within milliseconds the heating element 24 will be cycled such that it will melt the polyethylene 44b at 215° F. For an effective molecular bond to be created, it is imperative that the higher temperature nylon 44a material have completed its melt cycle and that the element 38 be in a cooling stage while the controls activate the heat element 24 to melt the lower temperature material polyethylene 44b. It should further be appreciated that it is feasible for a single heat element 24 to be provided the required cycling of temperatures to bond multiple dissimilar materials.

The pre-heating, heating, cooling, heating, cooling stages of this process must all take place within milliseconds for a proper bond to be created. Of course, the dwell time of the apparatus is very dependent on the materials to be fused. The entire heating and cooling process is electronically programmed at the controls 48 to ensure the proper sequence of events. The electronic process is programmable such that a single heating element may be cycled as required or so that multiple heating elements are cycled as demanded by the materials to be fused. Likewise, the activation of the cooling process is controlled in the same manner. The cooling process is critical so that the molecules of the multiple layers of polymeric material will congeal into a solid molecular configuration that will result in a material without any weak or thinning characteristics immediately next to the seam fused area. The seam fused area may also have to pass through a curing cycle depending upon the types and number of polymer layers present. It will also be appreciated that the cooling cycle assists and sometimes supplants the curing cycle at room temperature. The usual cycle time for electronically seam fusing dissimilar materials is between 1.25 seconds to 12 seconds, however; the curing cycle may take as long as eight hours.

Figure 5A:
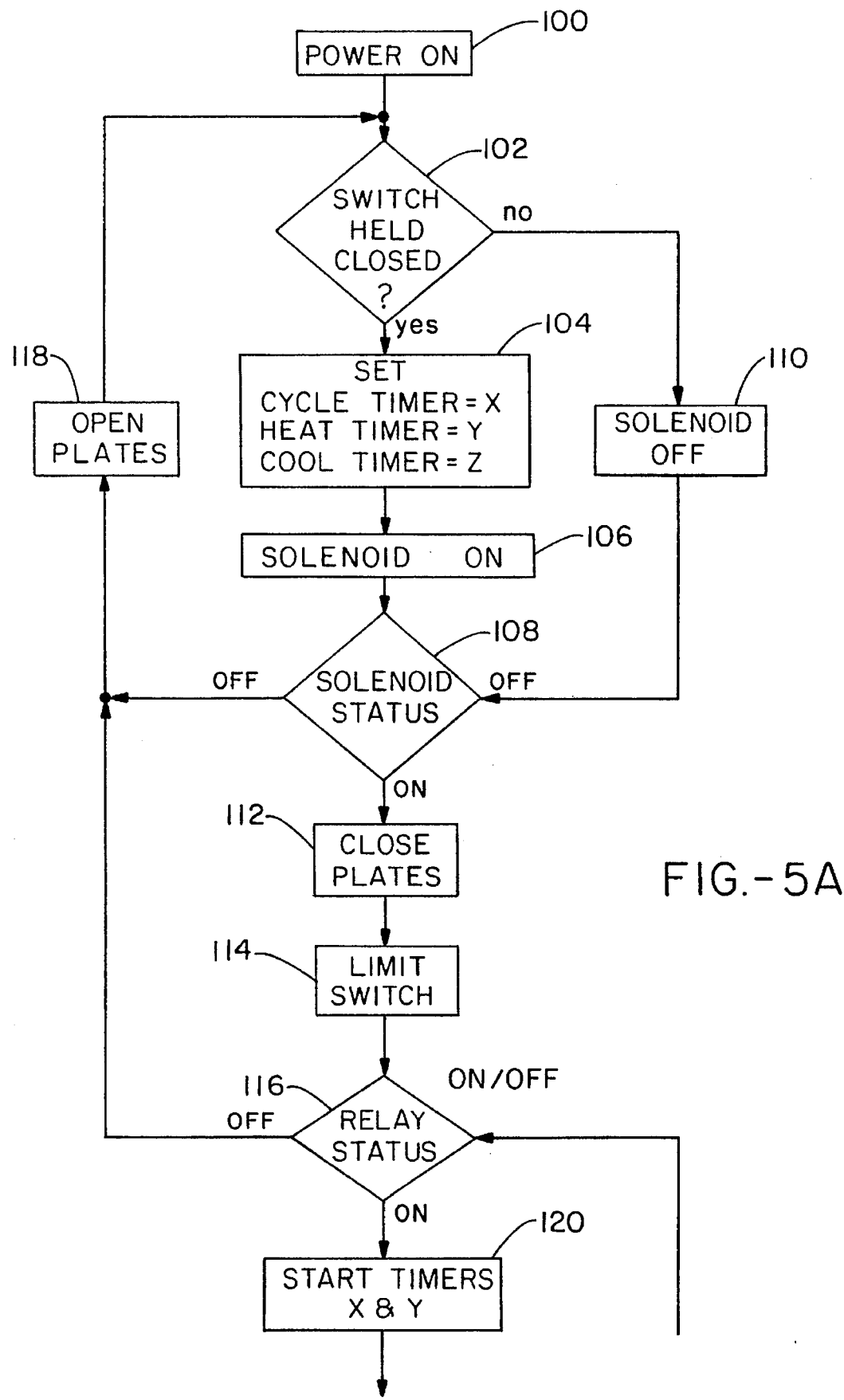
FIG. 5 is a flow chart depicting the overall sequential process for operating the controls of an electronic seam fuser.
Figure 5B:
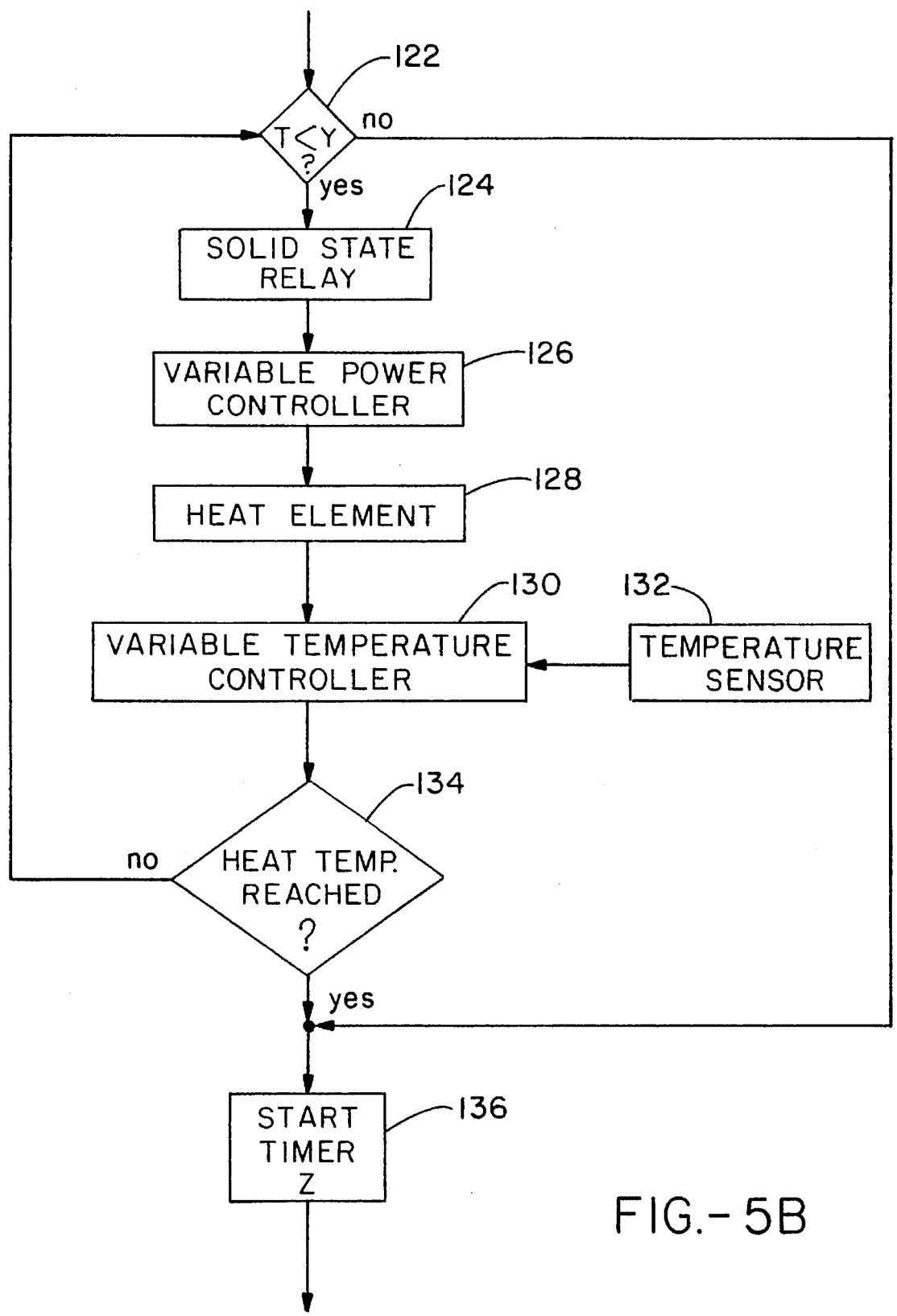
Figure 5C:
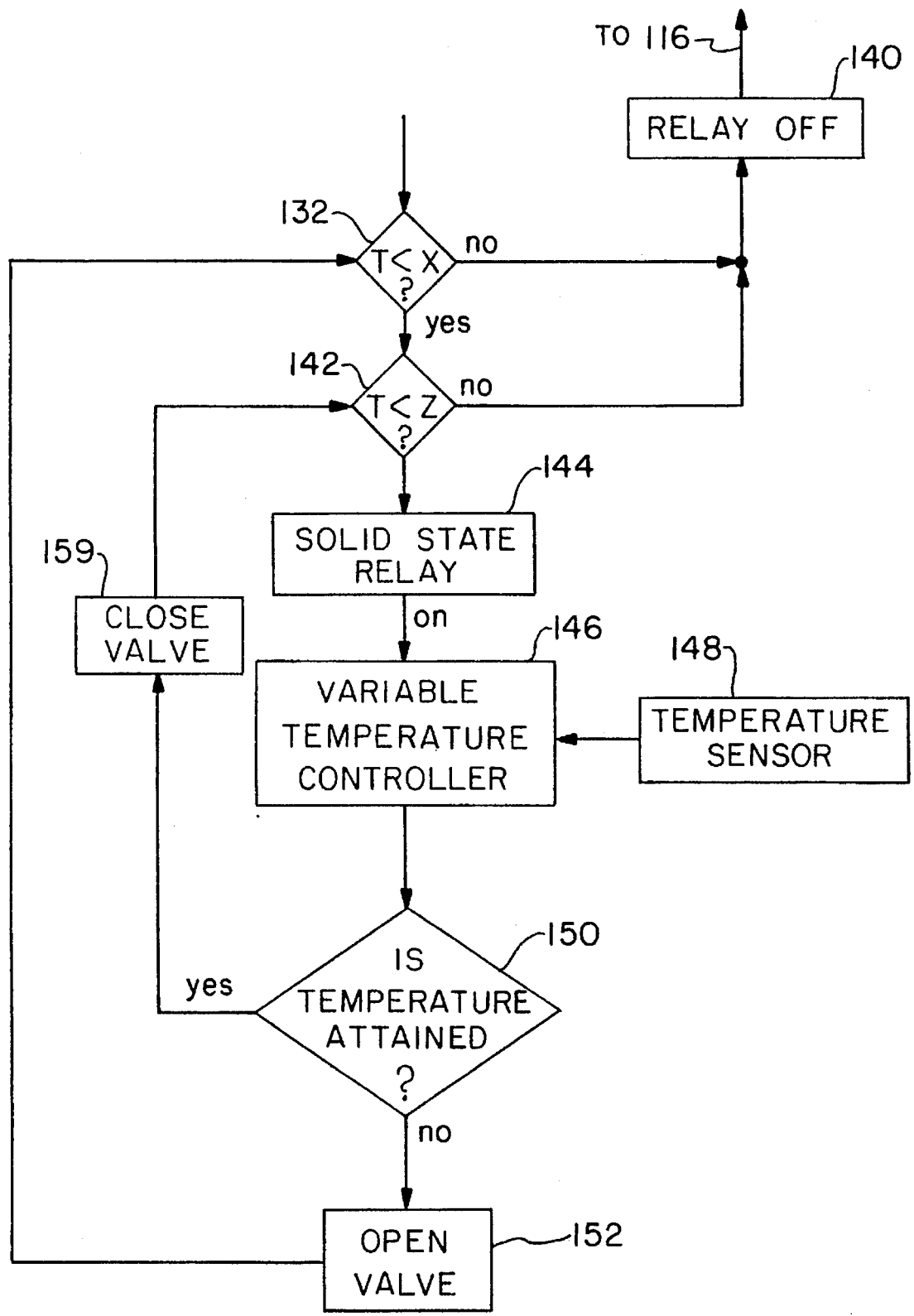

Referring now to FIG. 5, an exemplary process is illustrated which shows the sequential process of the electronic seam fuser 10 as it proceeds through the overall curing, heating, and cooling cycles. It will be appreciated that this exemplary process could be expanded and modified into any number of combinations or variations as needed depending upon the various types and of polymeric materials fused. Initially, at step 100, the power supply 70 is turned on to provide an input power to the electronic seam fuser 10. After power is supplied to the controller 48, at step 102, a cycle switch is closed by the operator. At step 104 the controller 48 sets the various timers required for the operation of the electronic seam fuser 10. Step 104 sets a cycle timer to a value designated by x, a heat timer to a value designated by y, and a cooling timer to a value designated by z. It will be appreciated that the aforementioned timers could be set manually or by a microprocessor. At this time, the controller 48 changes a solenoid register from "off" to "on" at step 106. Subsequently, at step 108, the controller 48 checks the status of the solenoid register. If at any time the cycle switch at step 102 is released, the controller 48 sets the solenoid register to an "off" designation at step 110. Therefore, at step 108, the solenoid status checker deactivates the solenoid and changes the solenoid register to "off." Once the solenoid has been activated, the plates 14 and 30 are closed at step 112. To ensure the proper operation of the seam fuser 10, a limit switch is biased to a normally "off" position. At step 114, when the plates 14 and 30 close upon the polymeric materials, the limit switch is biased to the "on" position. At step 116, if the limit switch has not been activated, the controller 48 proceeds to step 118 and opens the plates 14 and 30 and returns the controller 48 to step 100.

If at step 116, the limit switch is activated, a relay is activated so that at step 120 the cycle timer and the heat timer are started. The heating cycle starts at step 122, wherein the controller 48 evaluates whether the heat time has elapsed. If not, the controller proceeds to step 124 to engage a solid state relay which engages a variable power controller at step 126. Accordingly, at step 128, power is provided to the heating elements 24 and 38. At step 130, a variable temperature controller receives input from a temperature sensor at step 132. As discussed previously, the temperature sensor 66 used at step 132 may consist of a thermocouple, a device for measuring the corresponding current or voltage, or an infrared beam. Subsequently at step 134, the controller 48 checks to see if the desired heat temperature has been reached by the heating elements 24 and 38. If the desired heating temperature has not been reached, the controller returns to step 122 to check the status of the heating timer. If the heating timer has not elapsed, the controller 48 repeats steps 124–134. However, if the heating cycle time has elapsed, the controller 48 proceeds to the next step.

At step 136, the cooling timer z is initiated. It should also be appreciated that cooling timer z could be a delayed timer in that the timer is first initiated at step 120, but does not actually start the cooling cycle until step 136. Subsequently at step 138, the controller 48 checks if the overall cycle time x has elapsed. If so, at step 140, the relay register at step 116 is switched to on "off" position. Accordingly, the controller 48 proceeds to open the plates at step 118. If, however, the overall cycle time has not elapsed, the controller 48 checks the status of the cooling timer z. If the cooling timer z has not elapsed, the controller 48 proceeds to step 144 to turn on a second solid state relay. Accordingly, at step 146 a variable temperature controller monitors the cooling flow 50 and 52 by a temperature sensor at step 148. Subsequently, at step 150, the controller 48 checks to see if the desired cooling temperature has been attained. If so, a valve is closed at step 154 to stop the cooling flow 50 and 52, after which the controller 48 once again checks to see if the cooling cycle time has expired at step 142. If the cooling cycle time has not elapsed, steps 144 through 150 are repeated. If, however, at step 150 the cooling temperature has not been attained, the controller 48 opens the cooling valve at step 152. The controller 48 then returns to step 138 to check the status of the overall cycle timer x. If the overall cycle timer x has not elapsed, the controller 48 proceeds to repeat steps 142–154. Accordingly, if the overall cycle timer x has elapsed, the controller 48 proceeds to turn the relay off at step 116 and open plates 14 and 30 of the electronic seam fuser 10.

Those skilled in the art will appreciate that the flow chart described hereinabove can be added to or modified to accommodate varying types and thicknesses of polymeric materials. Furthermore, the variable timers which set the cycle time x the heat time y and the cooling time z could be replaced with fixed timers if it is known that the electronic seam fuser 10 is only going to be fusing specified types and quantities of polymeric materials. Moreover, it is apparent that by precisely controlling the variable cycle times a strong molecular bond is provided.

Figure 3:
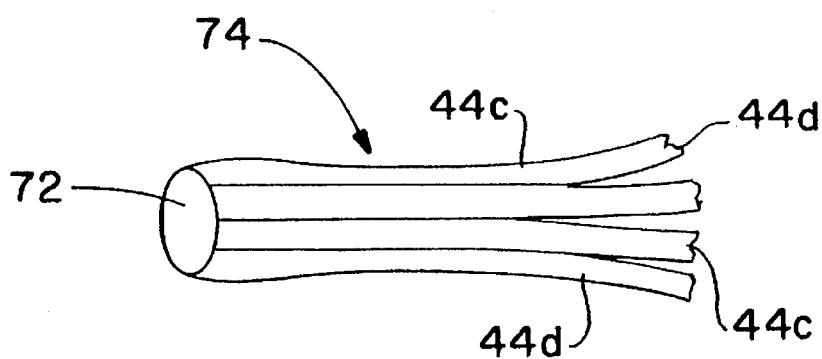
FIG. 3 illustrates a molecular bond exemplary of a seam fusing process utilizing the imprecise controls of the prior art.
Figure 4:
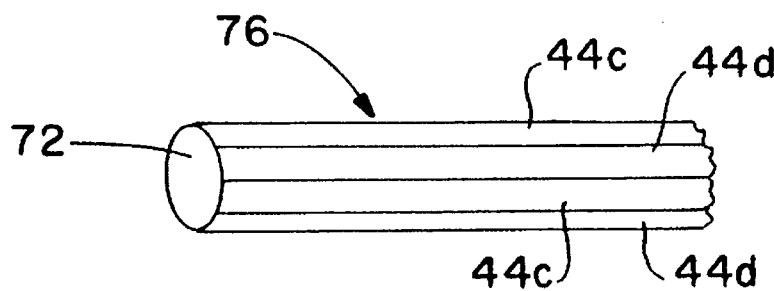
FIG. 4 illustrates a molecular bond exemplary of the seam fusing process of the present invention.

For example, a weak molecular bond and a strong molecular bond are illustrated in FIGS. 3 and 4. In particular, FIG. 3 shows a molecular bond area 72 where two dissimilar polymeric materials 44c and 44d were fused together. Due to the imprecise control of the heating, cooling, and pressure functions a weak joint area 74 will be formed. This is especially true when the heating element is placed within a cavity disposed within one of the plates, and the corresponding plate has a corresponding cavity where the material is to flow as the materials are heated. By requiring the material to flow to a cavity, the materials are put under additional stress, which can result in the weak melt bond area. A weak melt bond will result in the area next to the fuse not being as strong as the individual materials that were fused.

FIG. 4 is similar to FIG. 3 in that a molecular bond 72 joins together two dissimilar polymeric materials 44c and 44d. Due to the precise controls of heating, cooling and pressure, a strong joint area 76 will be formed. By disposing the polymeric materials 44c and 44d between a heating element 24 or 38 and the configuration enhancers 20 and 34, as the polymeric material is softened and then instantaneously melted, no undue stress is applied to the materials to create a weak joint area. Therefore, a melt bond is created (not a mechanical bond) wherein the molecular structure of each individual polymeric material is preserved, but where the molecular structure of each individual material is interleaved with the other materials.

A further feature of the present invention is that the heat barrier materials 22, 26, 36 and 40, have a non-adherent property so that when a polymeric material is raised to its melting temperature, the polymeric material will not stick to the heating elements 24 and 38 or the plates 14 and 30 as the closure force is withdrawn from the materials to be fused. The heat barrier materials 22, 26, 36, and 40 also serve to ensure that an even and effective transfer of heat is conducted from the heating elements to the multi-layer polymer materials to be so fused. Typically, the heat barrier material will be made of fiberglass, Teflon (TM of Dupont), silicone, or some other similar type material.

As those skilled in the art will appreciate, the present invention allows for the electronic seam fusing of dissimilar or similar polymeric materials which may be in the form of a woven, non-woven or film material. These different forms may appear as a laminated polymer configuration in either heterogeneous or homogeneous mix. For example, a woven polymer material may be laminated to a heterogenous or homogeneous non-woven or film polymer as one of the materials to be seam fused to a similar or dissimilar polymeric material. These materials may contain multiple layers of heterogeneous polymers with a wide range of softening and melting temperatures. The electronic seam fusing of these materials will create a bond that is as strong or stronger than the original materials themselves. Some of the polymer layers that may be utilized are very fragile; however, the present invention can seam fuse these fragile materials to other, stronger polymeric materials without altering their molecular composition and thus allowing the fragile materials to function as they were intended and as part of a finished product.

Figure 6:
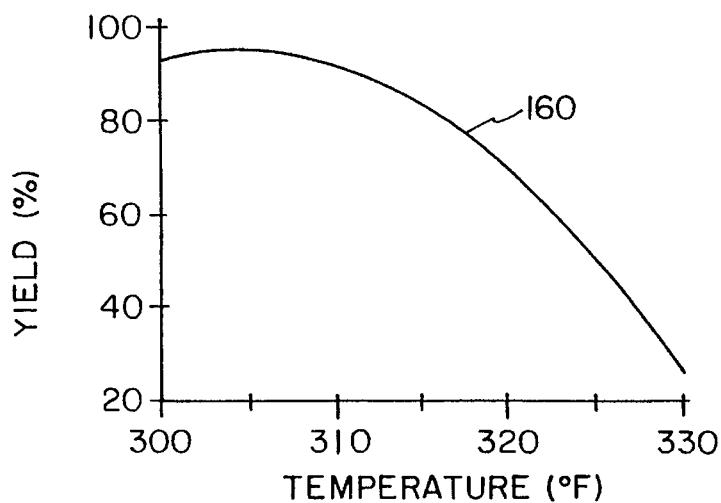
FIG. 6 is a yield-temperature graph illustrating the optimum temperature for a heating element in a seam fusing process.
Figure 7:
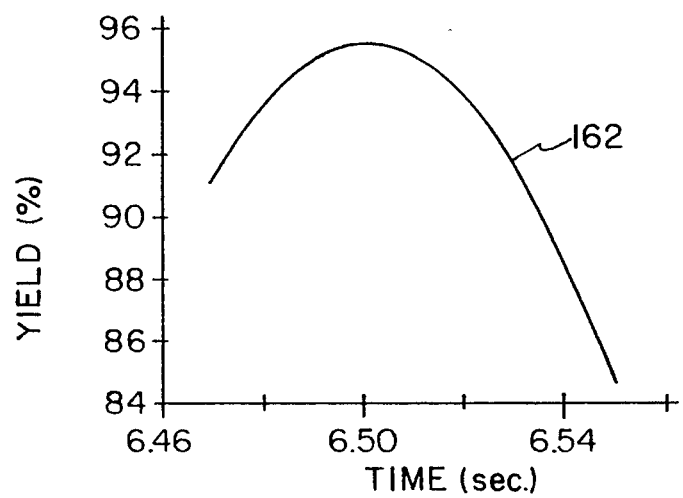
FIG. 7 is a yield-time graph showing the optimum dwell time of a seam fusing process.

In developing the electronic seam fusing process it has been determined that many different factors have varying levels of impact on the output characteristics of a seamed material. Referring now to FIGS. 6 and 7, the impact of temperature and time on the amount of yield of a seam fused product can be seen. In particular, FIG. 6 shows a yield-temperature curve 160 where the maximum yield is obtained when the temperature setting of a heating element in a seam fusing device is at 305° F. In a similar fashion, FIG. 7 illustrates a yield-time curve 162 where the maximum yield is obtained when the dwell time of the seam fusing devices approximately 6.5 seconds. Since the above described processes are singular in nature, FIGS. 6 and 7 can be combined to form the graph shown in FIG. 8.

Figure 8:
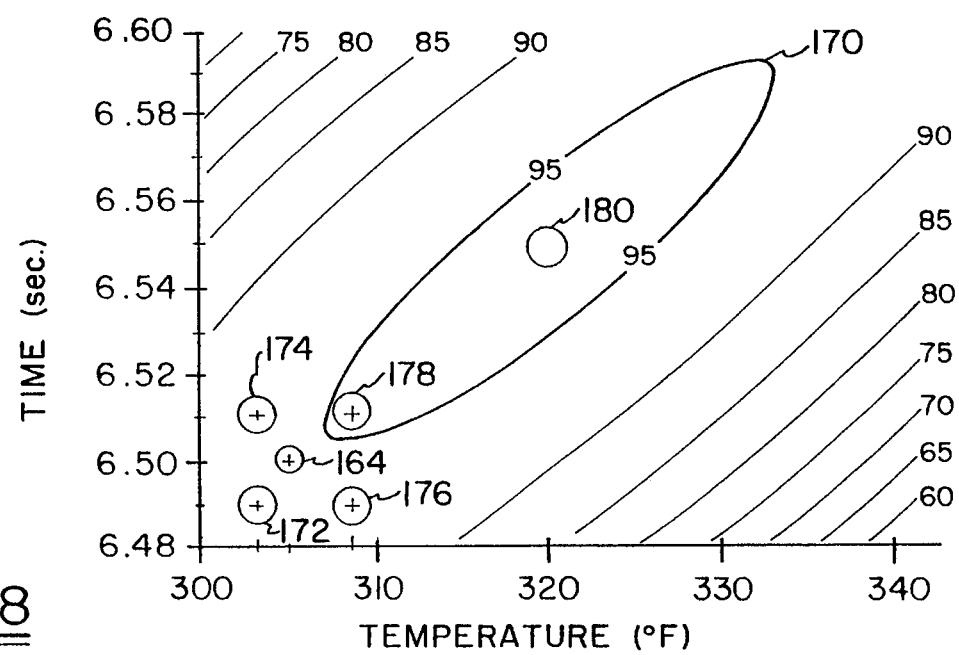
FIG. 8 is a time-temperature-yield graph illustrating the optimum time and temperatures of a seam fusing process.

FIG. 8 illustrates a graph with the temperature of the heating element on the horizontal axis, the dwell time factor on the vertical axis and the yield or output factor on the axis (coming out of the page) so as to provide a three dimensional or contour plot. Accordingly, it can be seen that a yield point 164, derived from FIGS. 6 and 7, is provided at the intersection of 305° F. and 6.5 seconds. As can be seen from the contour plot in FIG. 8, any change in the temperature or time done separately causes the yield to diminish. However, by concurrently adjusting both the temperature of the heating element and the dwell time, an optimum output of a seam fused material is realized.

Generally, a contour plot or time, temperature and yield curve 170 illustrates the optimum range of process parameters for both time and temperature in a seam fusing process. This optimum yield curve is obtained by observing the yield values at a 2×2 array of yield points 172, 174, 176 and 178. As those skilled in the art will appreciate, an optimum yield point 180 is obtained by comparing one set of yield points at a known temperature with another set of yield points at a second temperature. For example, by comparing yield points 174 and 172 with yield points 178 and 176, it can be seen that with respect to temperature, yield points 178 and 176 provide a better yield. In a similar manner, one set of yield points at a known dwell time are compared with another set of yield points at a second dwell time. Thus, it can be seen that with respect to dwell time, yield points 174 and 178 provide a better yield than yield points 172 and 176. By continually performing these calculations the optimum yield point 180 for both the temperature value and the dwell time value can be derived. Those skilled in the art will further appreciate that this optimization process can be employed with any number of factors. By carefully randomizing and replicating the preliminary production samples an optimum range of process parameters can be derived for each process factor.

In order to properly establish the optimization process for electronically seam fusing polymeric materials, the process variables or inputs and the process performance or outputs must be determined. Process variables include but are not limited to: the temperature of the heating elements; the clamping pressure of the closing plates; the amount of power applied to the heating element; the rate at which the power to the heating element is provided and removed; and the dwell time of the power applied. Additional process variables that are considered include the rate at which the closing plates are cooled, the element geometry of the polymeric materials, whether the materials have a rubber base or a teflon coating, the type of configuration enhancer employed and the impact force of the clamping pressure. Process performance or outputs that are considered in the optimization process include but are not limited to: the seam strength; how hard or easy it is to open a seam fused package; and package characteristics, such as whether a tear develops on the side of the package when a package is opened. Other process performance outputs that are considered are whether the package remains hermetically sealed after it is seamed, whether the seam process can cut one package cleanly from the other, and how long a seamed package must remain sealed.

Once the pertinent process variables and process performance outputs are determined, an estimation of the interaction between the process variables is required. In other words, what impact does the setting of one variable have on the setting of another variable. Also considered in the characterization process is the number of variables between which interactions can occur. Also considered is the uncontrolled variability in the process such as whether a specific change in the process performance occurred due to the intentional change in a process variable or whether the process performance is a result of the random variation of the process.

Figure 9A:
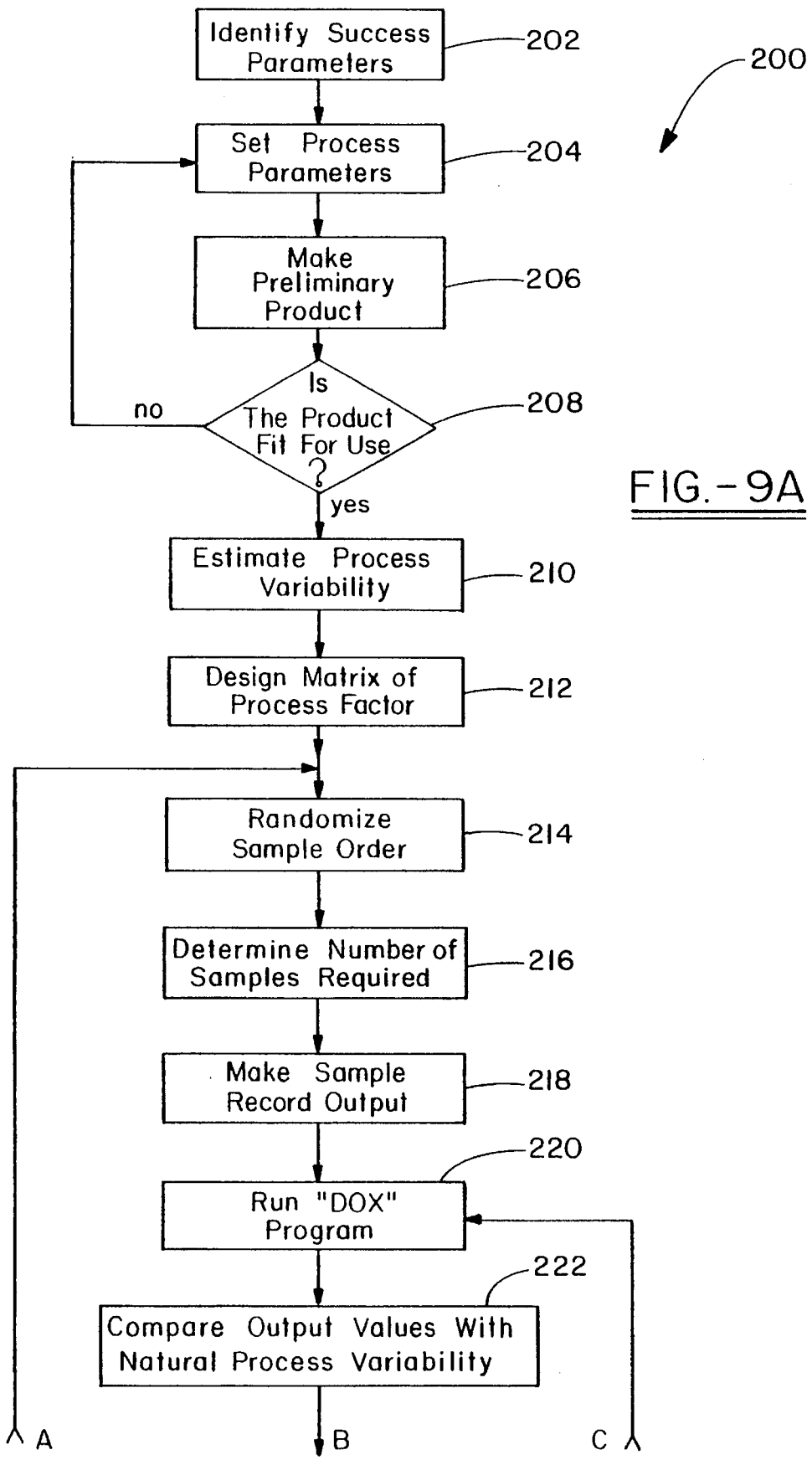
FIGS. 9A–B illustrates a flow chart depicting the overall sequential process for determining the optimal process parameters for the electronic seam fusing process.
Figure 9B:
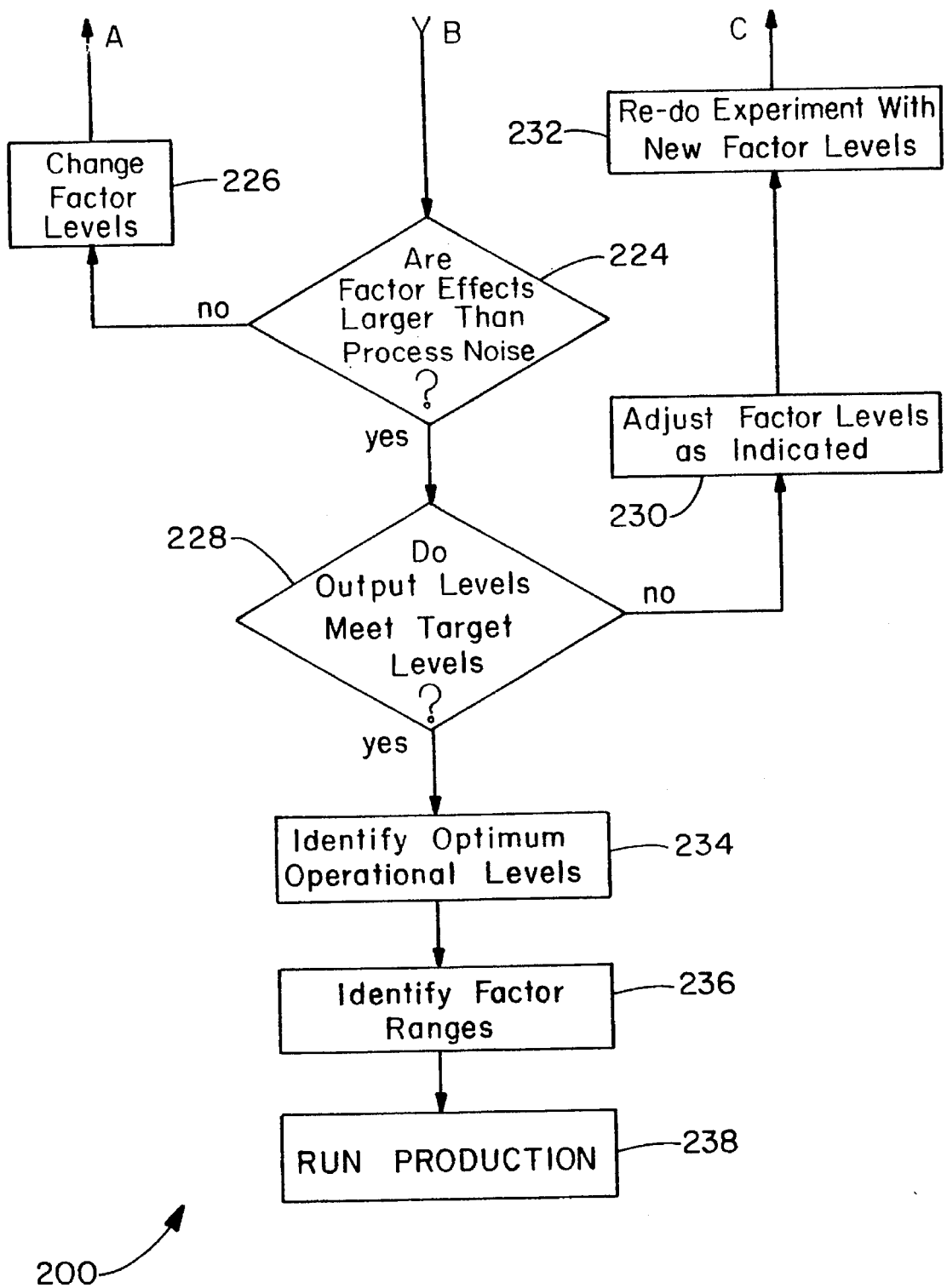

In order to properly understand the optimization process in the context of an electronic seam fusing apparatus, reference is now made to FIG. 9A and 9B where the optimization process is generally indicated by the numeral 200. The purpose of the optimization process is to determine what factors or variables the process is sensitive to i.e. cause and effect relationships, so as to determine which factors can be used to control the process. The optimization process 200 also determines how stable or robust the process is to variation and factor levels. Starting at step 202, the desired success parameters are identified. In other words, before the manufacturing process is started, the desired output characteristics must be determined. Based upon seam fusing experience, preliminary process parameters are set at step 204 for seam fusing a plurality of polymeric materials. At step 206, the preliminary process parameters are employed to manufacture a preliminary product. At step 208, initial testing is done to determine if the preliminary product is marginally fit for use. If the product is not fit for use, the optimization process is returned to step 204 to reselect the preliminary process parameters. However, if the preliminary product is determined to be fit for use the optimization process flow chart proceeds to step 210.

At step 210, a range of preliminary process parameters is estimated for seam fusing the plurality of polymeric materials. At step 212 these ranges of preliminary process parameters are established and assigned a low designation and a high designation respectively. For example, a heat element temperature of about 290° F. would be the low designation and about 310° F. would be the high designation. Accordingly, a matrix of process factors is designed for a test run employing the plurality of polymeric materials and the range of preliminary process parameters (the low and high designations). As such, every combination in the range of preliminary process parameters is employed to manufacture a test product. After a matrix of all combinations of factors has been established, the order in which these combinations are manufactured is randomized and performed at step 214 so that the test run provides the output characteristics of the test product. At step 216, the number of samples required to perform this testing is determined. Accordingly, at step 218 the appropriate samples are manufactured and the output characteristics therefrom are recorded.

At step 220, the output data is rearranged in the standard order established by step 212 and entered into a design of experiment (DOX) program. As those skilled in the art will appreciate, the DOX program statistically analyzes the output data or characteristics with respect to the range of preliminary process parameters to determine which preliminary process parameters have the most impact on the output characteristics. In other words, this statistical analysis provides a clear indication of which process variables are statistically significant in the seam fusing process. Additionally, results of the DOX program reveal where any interaction between factors (factor effects), such as time and pressure, have a significant impact on the seam fusing process. It will be appreciated that a design of experiment program can determine the interaction between two or more factors of the process variables in the seam fusing process.

After the results of the DOX program have been obtained, step 222 compares these output values with the natural process variability of the electronic seam fuser device. As such, at step 224 a determination is made as to whether the factor effects are larger than the process noise. If it is determined that the factor effects are not larger than the process noise, the factor levels are changed at step 226 and the flow chart is returned to step 214 so that the process parameters may be adjusted to provide another test run with adjusted factor levels. However, if the factor effects are larger than the process noise, the optimization process 200 proceeds to step 228 to determine if the output characteristics or values meet the predetermined target levels. If the predetermined target levels are not met, the factor levels are adjusted as required at step 230 and the testing samples are manufactured once again with new factor levels at step 232 and the output data derived therefrom is resubmitted to the DOX program at step 220. If it is determined that the output values do meet the desired target levels, the optimum operating levels are identified at step 234 and an optimum factor range is identified at step 236. Finally, at step 238, production runs may be employed with the optimized factor ranges determined for that particular set of polymeric materials and desired output characteristics.

It will be appreciated by those skilled in the art that the above described optimization process can be employed with any number of polymeric materials wherein the polymeric materials are made up of dissimilar layers. It will also be appreciated that once the desired range of process parameters is established, these ranges will be employed in the seam fusing process described earlier.

As can be seen in the following examples, the sheets of materials are arranged so that a layer of one sheet is disposed against a like layer of a second sheet. As will be described in further detail below, the electronic seam fuser 10 shown in FIG. 1 cycles the temperature of the heating element so as to selectively soften, melt and fuse each layer of a sheet of polymeric material to each like layer of a second sheet of polymeric material. Those skilled in the art will appreciate that as each layer of a sheet polymeric material melts, the molecules of these layers first seek out other like molecules and bond thereto. By simultaneously applying a cooling temperature, when required, the integrity of each molecular bond between like layers is maintained. In other words, by carefully controlling heating and cooling, the molecules of one layer of material are not permitted to molecularly bond to molecules of other dissimilar layers in this example.

In order to properly seam fuse like sheets of polymeric material that have dissimilar layers, the softening, melting, cooling and remelting temperature ranges of each layer of polymeric material must be determined. In these examples, the materials listed have the following temperature ranges for the indicated characteristic. (All temperatures listed below are in degrees Fahrenheit.)

| Material | Temperatures | | | |
|---|---|---|---|---|
| | Soften | Melting | Cooling | Re-melting |
| LLDPE | 160–200 | 192–232 | 156–196 | 197–237 |
| HDPE | 181–221 | 210–250 | 184–224 | 219–259 |
| PET | 324–364 | 363–403 | 338–378 | 452–512 |
| Nylon 6,12 | 347–387 | 354–394 | 327–367 | 381–421 |
| LLDPE/HDPE/ LLDPE | 162–200 | 192–232 | 156–196 | 197–237 |
| LDPE | 170–210 | 202–242 | 166–192 | 197–237 |
| CLAF | 181–221 | 210–250 | 184–224 | 207–247 |

Figure 10:
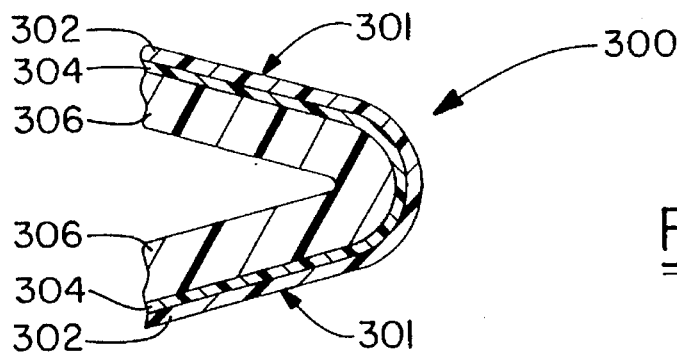
FIG. 10 illustrates a molecular bond exemplary of the seam fusing process of the present invention for polymeric materials having multiple dissimilar layers of polymeric material.

In particular, FIG. 10 provides an example of a seam fused product 300. The product 300 is made up of two pieces of polymeric material 301 wherein each sheet of material has a layer of polyester (PET) 302, a layer of high density polyethylene (HDPE) 304 and a layer of linear low density polyethylene (LLDPE) 306. As those skilled in the art will appreciate, the polyester layer 302 and the high density polyethylene layer 304 provide structural strength to the container that is formed by seam fusing the like materials together. Moreover, the layer of linear low density polyethylene 306 is employed as a sealing material to properly preserve and keep fresh the contents contained within the package. It should also be understood that each sheet of material 301 has a negligible adhesive layer disposed between each layer for bonding each layer to one another.

It will also be appreciated that the polymeric materials shown in FIG. 10 are such that the layer of polyester 302 has a thickness ranging from about 0.0006 inch to about 0.0009 inch. Additionally, the layer of high density polyethylene 304 has a thickness ranging from about 0.0004 inch to about 0.0006 inch, and the layer of linear low density polyethylene 306 has a thickness ranging from about 0.0024 inch to about 0.0036 inch.

Figure 11:
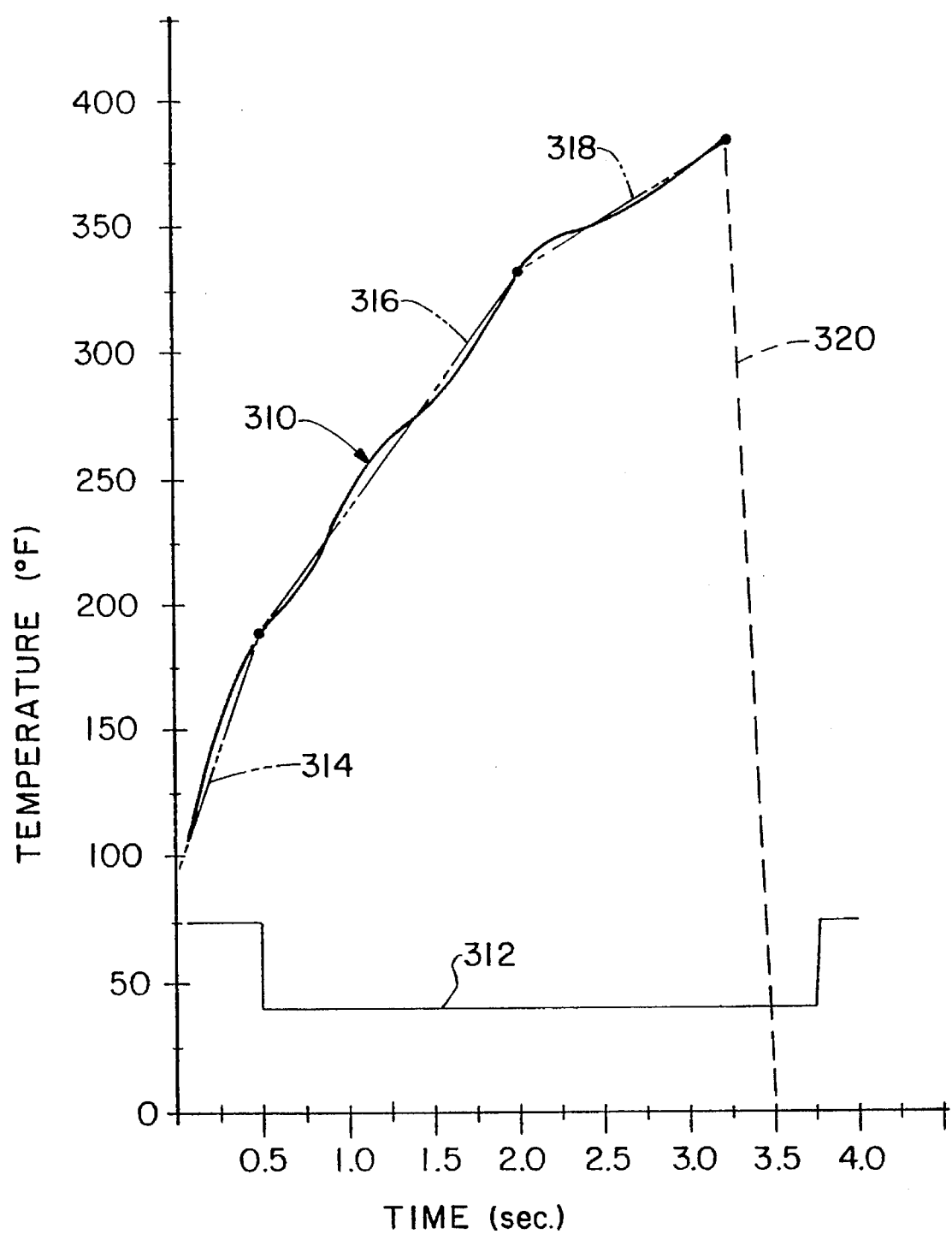
FIG. 11 is a time sequence chart illustrating the cycling of a heating element and a cooling element during the seam fusing process of the materials shown in FIG. 10.

Referring now to FIG. 11, a time-temperature graph is shown to more accurately describe the seam fusing process of the polymeric materials exemplified in the seam 300. FIG. 11 provides a heating element temperature curve 310 and cooling element temperature curve 312. Curve 310 illustrates four distinct cycles or slopes 314–320 of the temperature variations experienced by the heating element during the seam fusing process. In a similar manner, curve 312 illustrates when the application of the cooling cycle occurs during the seam fusing process.

The method for this example provides that two like pieces of polymeric material 301 are inserted between first and second plates, and the first and second plates are closed upon the polymeric materials. Prior to starting the seam fusing process the heating element is preheated to a temperature of about 90° F. and the cooling temperature is maintained at an ambient temperature of about 72° F. After the plates are closed upon the polymeric materials the temperature of the heating element is cycled to a temperature of between 175° F. and 225° F. during a time period of 0 seconds to 0.75 seconds as shown by the cycle 314. At about 0.5 seconds, the cooling cycle 312 is started such that the cooling temperature is lowered to about 40° F. Therefore, cycle 314 functions to soften, melt and fuse the layers of linear low density polyethylene 306 to one another without damaging the molecular structure of the linear low density polyethylene 306 or the molecular structure of any of the other materials.

At cycle 316, the heating element is raised to a temperature of between 300° F. and 350° F. during a time period of between 0.25 seconds to 2.25 seconds after the heating element is initially cycled. During cycle 316, the molecular structure of each layer of the high density polyethylene 304 is softened, melted and fused to one another without damaging the molecular structure of the other polymeric materials.

At cycle 318 of the seam fusing process, the heating element is raised to a temperature of between 350° F. and 400° F. during a time period of between 1.75 seconds to 3.5 seconds after the heating element is initially cycled. During cycle 318, the molecular structure of each layer of polyester 302 is softened, melted and fused to one another without damaging the molecular structure of the other polymeric materials.

At cycle 320, the voltage applied to the heating element is removed so that the temperature thereof is reduced from between 350° to 400° F. to an ambient temperature of about 72° F. during a time period of 3.0 seconds to 3.75 seconds after the heating element is initially cycled. Somewhat simultaneous with the removal of voltage from the heating element, the cooling cycle 312 is completed so that the cooling temperature is returned to about an ambient temperature of 72° F. during a time period of 3.5 seconds to 4.0 seconds after the heating element is initially cycled.

The duration of both the heating cycles and cooling cycles as presented in FIG. 11 are dictated by a 65 volt power setting on the seam fusing device. Those skilled in the art will appreciate that other voltage settings could be employed so as to shorten or lengthen the appropriate cycle times for each phase of the seam fusing process.

Figure 12:
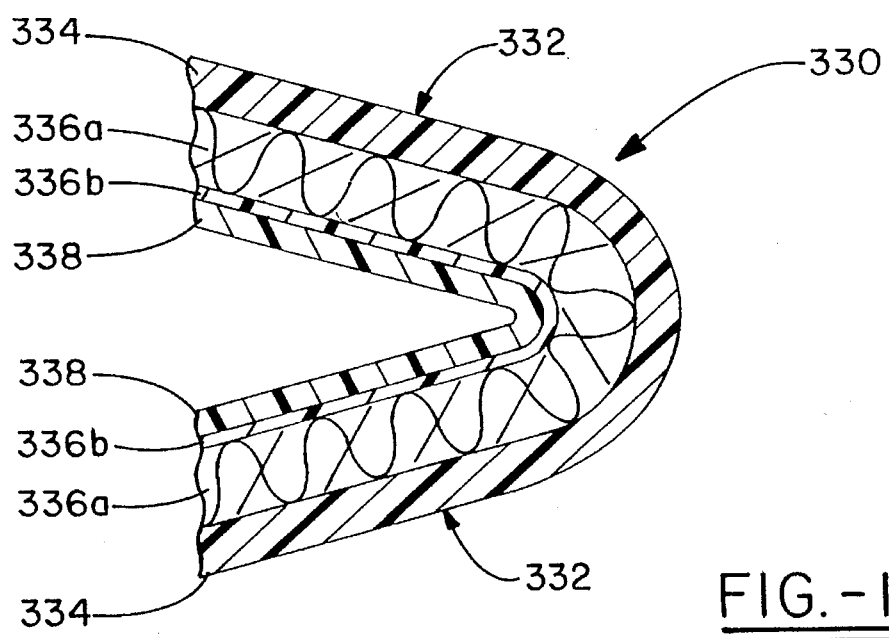
FIG. 12 illustrates a molecular band exemplary of the seam fusing process of the present invention for polymeric materials having multiple dissimilar layers of polymeric material.
Figure 13:
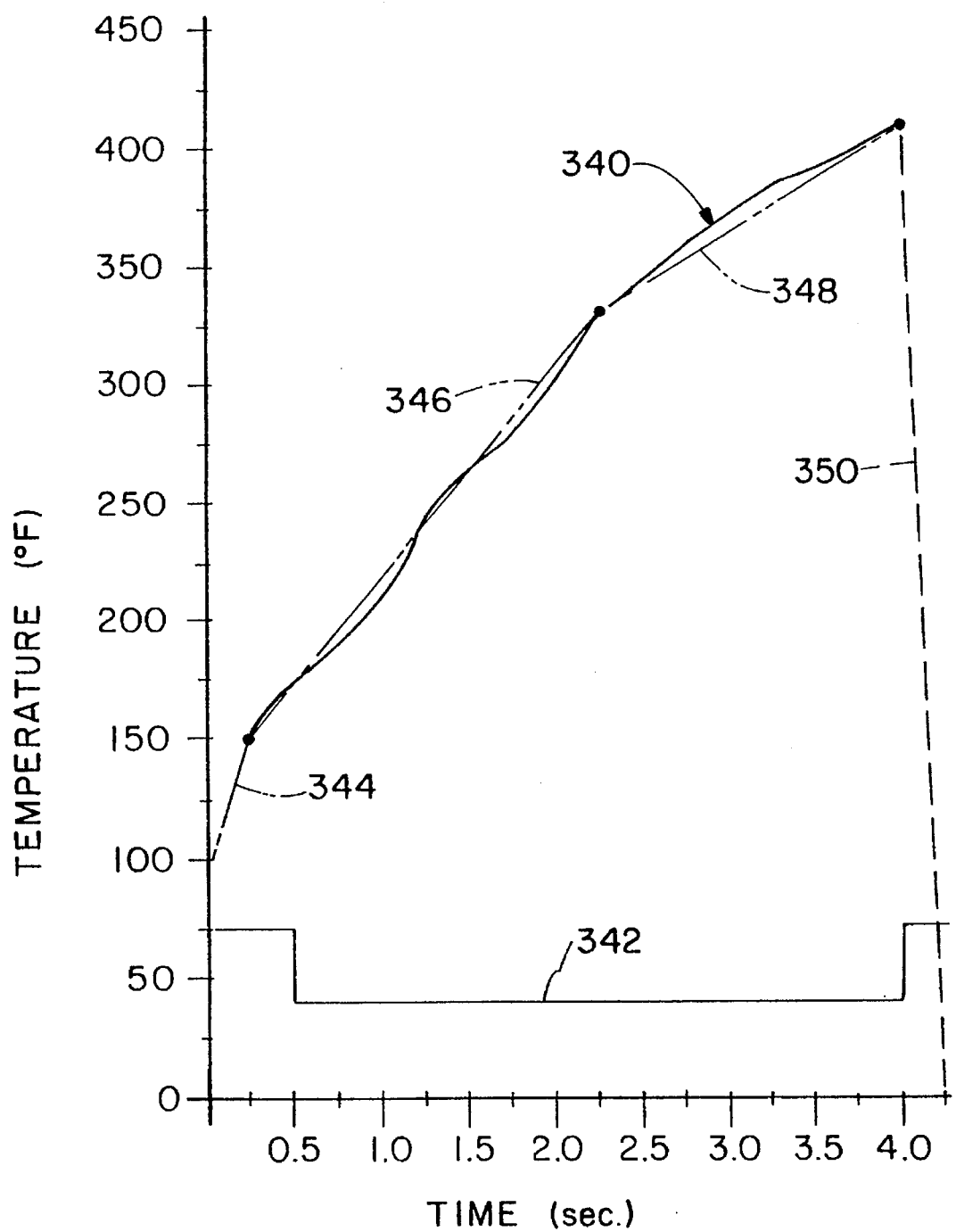
FIG. 13 is a time sequence chart illustrating the cycling of a heating element and a coding element during the seam fusing process of the materials shown in FIG. 12.

Another example of the seam fusing process is provided at FIGS. 12 and 13. In particular, FIG. 12 provides an example of a seam fused product 330 which is made up of three pieces of polymeric material 332 wherein each sheet of material has a layer of polyester (PET) 334, a composite material 336 which includes a layer of fabric 336a and a layer of low density polyethylene (LDPE) 336b, and a layer of linear low density polyethylene (LLDPE) 338. The layer of fabric 336a, in this embodiment, is a 3S CLAF fabric, which is a scrim type material commercially available from the Niseki Company of Japan, their Part No. 93-437. The layer of PET 334 and the layer of composite material 336 provide structural strength to the enclosure of container that is formed by seam fusing the like materials together. Moreover, the layer of linear low density polyethylene 338 is employed as a sealing material to properly preserve and keep fresh the contents contained within the package. Where required, each sheet of material 332 has a negligible adhesive layer disposed between each layer for bonding to one another.

In the present example, the polymeric material shown in FIG. 12 are such that the layered polyester 334 has a thickness ranging from about 0.00036 inch to about 0.00060 inch. The layer of fabric 336a has a thickness ranging from about 0.00688 inch to about 0.01032 inch, and the layer of low density polyethylene 336b has a thickness ranging from about 0.0004 inch to about 0.0006 inch. Finally, the layer of linear low density polyethylene 338 has a thickness ranging from about 0.001 inch to about 0.003 inch.

Referring now to FIG. 13, a time temperature graph is shown to more accurately describe the seam fusing process of the polymeric materials exemplified in the seam 330. FIG. 12 provides a heating element temperature curve 340 and a cooling element temperature curve 342. Curve 340 illustrates four distinct cycles or slopes 344–350 of the temperature variations experienced by the heating element during the seam fusing process. In a similar manner, curve 342 illustrates when the application of the cooling cycle occurs during the seam fusing process.

As before, this example provides that two like pieces of polymeric material are inserted between first and second plates, and the first and second plates are closed upon the polymeric materials. Prior to starting the seam fusing process, the heating element is preheated to a temperature of about 90° F. and the cooling temperature is maintained at an ambient temperature of about 72° F. After the plates are closed upon the polymeric materials the temperature of the heating element is cycled to a temperature of between 125° F. and 175° F. during a time period of zero seconds to 0.5 seconds as shown by cycle 344. At about 0.5 seconds, the cooling cycle 342 is started such that the cooling temperature is lowered to about 40° F. Therefore, cycle 344 functions to soften, melt and fuse the layers of linear low density polyethylene 338 to one another without damaging the molecular structure thereof or the molecular structure of any other of materials contained within the seam fused product 330.

At cycle 346, the heating element is raised to a temperature of between 310° F. and 360° F. during the time period of between 0.125 seconds to 2.5 seconds after the heating element is initially cycled. During cycle 346, the molecular structure of each layer of fabric 336a and low density polyethylene 336b is softened, melted and fused to one another without damaging the molecular structure of the other polymeric materials.

At cycle 348 of the seam fusing process, the heating element is raised to a temperature of between 375° F. and 425° F. during a time period of between 2.0 seconds to 4.25 seconds after the heating element is initially cycled. During cycle 348, the molecular structure of each layer of polyester 334 is softened, melted, and fused to one another without damaging the molecular structure of the other polymeric materials.

At cycle 350, the voltage applied to the heating element is removed so that the temperature thereof is reduced from between 375° F. to 425° F. to an ambient temperature of about 72° F. during a time period of 3.75 seconds to 4.25 seconds after the heating element is initially cycled. Somewhat simultaneously with the removal of voltage from the heating element, the cooling cycle 342 is completed so that the cooling temperature is returned to an ambient temperature of 72° F. during a time period of 3.75 seconds to 4.25 seconds after the heating element is initially cycled.

The duration of both the heating cycle and cooling cycle as presented in FIG. 13 are dictated by a 65 volt power setting on the seam fusing device. Of course, other voltage settings could be employed so as to shorten or lengthen the appropriate cycle times for each phase of the seam fusing process.

Figure 14:
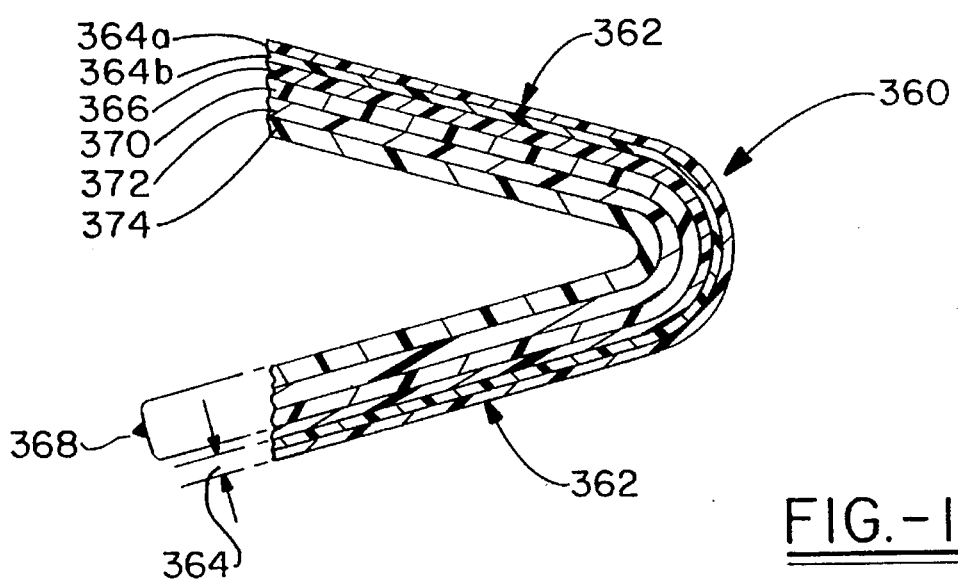
FIG. 14 illustrates yet another molecular bond exemplary of the seam fusing process of the present invention for polymeric materials having multiple dissimilar layers of polymeric material.
Figure 15:
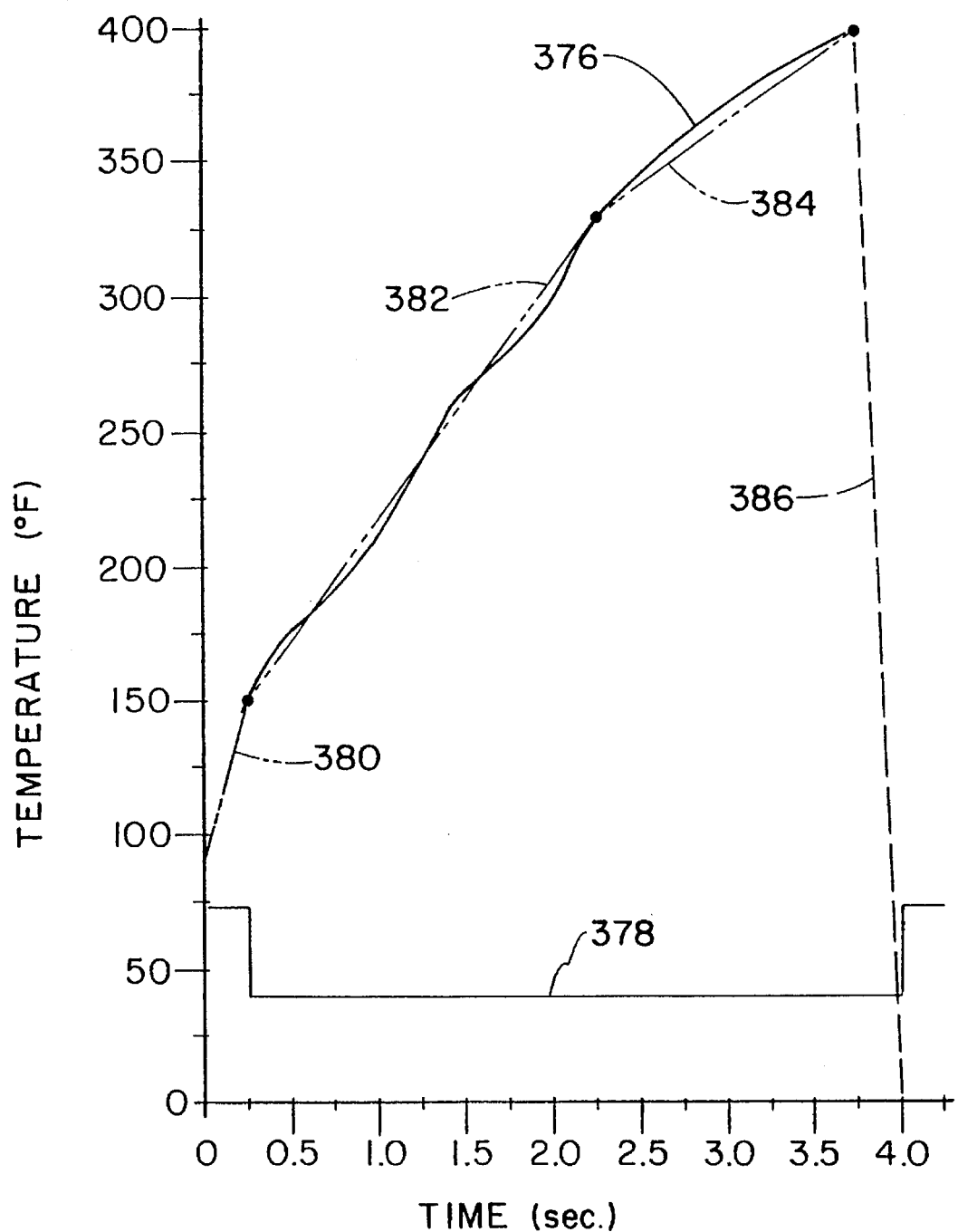
FIG. 15 illustrates a time sequence for the cycling of a heating element and a cooling element during the seam fusing process of the materials shown in FIG. 14.

Still another example of the versatility of the seam fusing device is presented in FIGS. 14 and 15. In particular, FIG. 14 illustrates an example of a seam fused product 360, wherein the seam 360 is made up of two pieces of polymeric material 362 wherein each piece of polymeric material 362 has five dissimilar layers of polymeric material. In this example, the sheet of polymeric material 362 has a layer of polyester (PET) 364, which is made up of a first layer of polyester 364a, a reverse layer of polyester 364b, a layer of nylon 366, and a layer of a co-extruded sheet 368. The co-extruded sheet 368 is made up of a sub-layer of linear low density polyethylene 370, a sub-layer of high density polyethylene 372 and a sub-layer of linear low density polyethylene 374. As before, these various layers of polymeric material provide the necessary structural strength and sealing properties to properly preserve and contain the contents held within a seam fused package. As before, each sheet of material 362 may have a negligible adhesive layer disposed between the dissimilar layers for bonding purposes.

The polymeric material shown in FIG. 14 are such that the layer of polyester 364a has a thickness ranging from about 0.00036 inch to about 0.00060 inch and where the reverse layer of polyester 364b also has a thickness ranging from about 0.00036 inch to about 0.00060 inch. The layer of nylon 366 has a thickness ranging from about 0.00040 inch to about 0.00060 inch. Finally, the coextruded layer of polymeric material 368 has a thickness ranging from about 0.00150 inch to about 0.00450 inch. In particular, the sub-layer of linear low density polyethylene 370 has a thickness ranging from about 0.00050 inch to about 0.00150 inch, the sub-layer of high density polyethylene 372 has a thickness ranging from about 0.00050 inch to about 0.00150 inch and the sub-layer of linear low density polyethylene 374 has a thickness ranging from about 0.00050 inch to about 0.00150 inch.

Referring now to FIG. 15, a time-temperature graph is shown to more accurately describe the seam fusing process of the polymeric materials exemplified in the seam 360. FIG. 15 provides a heating element temperature curve 376 and a cooling element temperature curve 378. Curve 376 illustrates four distinct cycles or slopes 380–386 of the temperature variations experienced by the heating element during the seam fusing process. In a similar manner, curve 378 illustrates when the application of the cooling cycle occurs during the seam fusing process.

As before, the method for seam fusing provides that two like pieces of polymeric material 362 are inserted between first and second plates, and the first and second plates are closed upon the polymeric materials. Prior to starting the seam fusing process the heating element is preheated to a temperature of about 90° F. and the cooling temperature is maintained at an ambient temperature of about 72° F. After the plates are closed upon the polymeric materials, the temperature of the heating element is cycled to a temperature of between 125° F and 175° F. during a time period of between 0 seconds to 0.5 seconds as shown at cycle 380. At about 0.25 seconds, the cooling cycle 378 is started such that the cooling temperature is lowered to about 40° F. Therefore, cycle 380 functions to soften, melt and fuse the layers of linear low density polyethylene 370, the Sublayer of high density polyethylene 372 and the sublayer of linear low density polyethylene 374.

At cycle 382, the heating element is raised to a temperature of between 310° F. and 360° F. during a time period of between 0.125 seconds to 2.5 seconds after the heating element is initially cycled. During cycle 382, the molecular structure of each layer of nylon 366 is softened, melted, and fused to one another without damaging the molecular structure of the other polymeric materials.

At cycle 384, the heating element is raised to a temperature of between 375° F. to 425° F. during a time period of between 2.0 seconds to 4.0 seconds after the heating element is initially cycled. During cycle 384, the molecular structure of each layer of polyester 364a and polyester 364b are softened, melted and fused to one another without damaging the molecular structure of the other polymeric materials.

At cycle 386, the voltage applied to the heating element is removed so that the temperature thereof is reduced from between 375° F. to 425° F. to an ambient temperature of about 72° F. during a time period of 3.5 seconds to 4.25 seconds after the heating element is initially cycled. Somewhat simultaneous with the removal of voltage from the heating element, the cooling cycle 378 is completed so that the cooling temperature is returned to about an ambient temperature of 72° F. during a time period of 3.75 seconds to 4.25 seconds after the heating element is initially cycled.

The duration of both the heating cycles and cooling cycles as presented in FIG. 15 are dictated by a 65 volt power setting on the seam fusing device. As before, other voltage settings could be employed so as to shorten or lengthen the appropriate cycle times for each phase of the seam fusing process.

As is readily apparent from the above descriptions, the electronic seam fusing device presents numerous advantages. First, the optimization process in conjunction with the electronic seam fusing device allows for ascertaining the required process settings for obtaining repeatable predetermined pull strengths of packages that employ seam fused polymeric materials. The optimization process allows for adjusting the pull strengths to desired predetermined levels such that only the seam itself can be opened and the associated polymeric material does not tear during the opening process. A further advantage of the electronic seam fusing device in conjunction with the optimization process is that heat process settings can be adjusted during the sealing process. By appropriately controlling and limiting the period and amount of heat applied, the contents contained within a package of polymeric materials, such as food, is not destroyed. Moreover, ingredients contained within the food do not interfere with the sealing process causing an inadequate seal which might eventually damage the contents contained within the package.

Yet another advantage of the present invention is that a cost savings can be realized by eliminating some of the layers contained within a polymeric material. For example, linear low density polyethylene is typically used as the sealing member of a multi-layer polymeric film. By molecularly bonding lower cost materials within the polymeric material, a seal can be obtained that is the functional equivalent of linear low density polyethylene. As such, the cost of the linear low density polyethylene can be eliminated from the packaging material. Still another advantage of the present invention is that the electronic seam fusing device and the optimization process can establish the required temperature settings so that a package can be simultaneously cut as it is sealed thereby eliminating the need for a second cutting operation of the package which is required by current thermoplastic bonding devices.

Thus it can be seen that the objects of the invention have been satisfied by the structure presented above. It should be apparent to those skilled in the art that the object of the present invention can be practiced with any type of polymeric material, similar or dissimilar, in any number of multiples and in any desired shape.

While a preferred embodiment of the invention has been presented and described in detail, it will be understood that the invention is not limited thereto or thereby. Accordingly, for an appreciation of the true scope and breadth of the invention, reference should be made to the following claims.

What is claimed is:

1. A method for optimizing process parameters for electronically seam fusing polymeric materials which comprises the steps of:

setting preliminary process values for at least two process parameters for a plurality of polymeric materials;

estimating a range of preliminary process values for said plurality of polymeric materials, wherein each said range is defined by a high designation and a low designation, with each preliminary process value therebetween;

designing a test run employing said plurality of polymeric materials and said high and low designations;

performing said test run so as to obtain output data for each combination of said high and low designations with respect to each said process parameter;

analyzing statistically said output data with respect to said combinations of said high and low designations:

identifying optimum process parameters for said plurality of polymeric materials from said analyzing step; and seam fusing said polymeric materials with said optimum process parameters.

2. The method according to claim 1, including the additional steps of:

inserting polymeric materials between first and second plates;

closing said first and second plates upon said polymeric materials for a predetermined period of time thereby fusing said materials together;

regulating a temperature as determined by the optimizing process of at least one heating elements disposed on one of said first and second plates;

cycling said temperature of said at least one heating element between different predetermined temperatures during said predetermined period of time, as determined by the optimizing process, depending upon the fusing characteristics of said polymeric materials;

opening said first and second plates; and removing said seam fused materials.

3. The method, as set forth in claim 2, including the additional steps of:

regulating a temperature as determined by the optimizing process of a first cooling means disposed within said first plate;

regulating a temperature as determined by the optimizing process of a second cooling means disposed within said second plate;

regulating a temperature as determined by the optimizing process of a second heating element disposed on said second plate;

cycling said temperature of said second heating element between different predetermined temperatures during said predetermined period of time as determined by the optimizing process depending upon the fusing characteristics of said polymeric materials; and regulating a dwell time of the closure of said first and second plates as determined by the optimizing process.

4. The method, as set forth in claim 3, including the additional step of:

cycling said temperatures of said first and second cooling means between different predetermined temperatures during said predetermined period of time depending upon fusing characteristics of said polymeric materials.

5. A method for optimizing process parameters for electronically seam fusing polymeric materials which comprises the steps of:

identifying desired output characteristics for a plurality of polymeric materials to be seam fused;

setting preliminary process values for at least two process parameters for seam fusing said plurality of polymeric materials;

manufacturing a preliminary product to ensure that said preliminary process parameters provide a marginally fit product of seam fused polymeric materials;

estimating a range of preliminary process parameters for seam fusing, wherein each said range is defined by a high designation and a low designation with each preliminary process value therebetween;

designing a test run employing said plurality of polymeric materials and said range of preliminary process parameters for each combination of said high and low designations with respect to each said process parameter employed to manufacture a test product;

randomizing and performing said test run so as to obtain output characteristics of said test product;

analyzing statistically said output characteristics with respect to said high and low designations to determine which preliminary process parameters have the most impact on said output characteristics;

concurrently adjusting said preliminary process parameters according to the above steps until a plurality of optimum process parameters for electronically seam fusing said polymeric materials are determined to achieve the desired output characteristics; and seam fusing said polymeric materials with said optimum process parameters.

6. The method, as set forth in claim 5, including the additional steps of:

inserting polymeric materials between first and second plates;

closing said first and second plates upon said polymeric materials for a predetermined period of time thereby fusing said materials together;

regulating a temperature as determined by the optimizing process of at least one heating elements disposed on one of said first and second plates;

cycling said temperature of said at least one heating element between different predetermined temperatures during said predetermined period of time, as determined by the optimizing process, depending upon the fusing characteristics of said polymeric materials;

opening said first and second plates; and removing said seam fused materials.

7. The method, as set forth in claim 6, including the additional steps of:

regulating a temperature as determined by the optimizing process of a first cooling means disposed within said first plate;

regulating a temperature as determined by the optimizing process of a second cooling means disposed within said second plate;

regulating a temperature as determined by the optimizing process of a second heating element disposed on said second plate;

cycling said temperature of said second heating element between different predetermined temperatures during said predetermined period of time as determined by the optimizing process depending upon the fusing characteristics of said polymeric materials; and regulating a dwell time of the closure of said first and second plates as determined by the optimizing process.

8. The method, as set forth in claim 7, including the additional step of:

cycling said temperatures of said first and second cooling means between different predetermined temperatures during said predetermined period of time depending upon fusing characteristics of said polymeric materials.

9. A method for seam fusing polymeric materials which comprises the steps of:

inserting two pieces of polymeric material between first and second plates, wherein each piece of polymeric material has at least three dissimilar layers of polymeric material;

closing said first and second plates upon said polymeric materials; providing at least one heating element disposed on one of said first and second plates;

raising the temperature of said heating element to a first temperature range within a first predetermined time period to fuse one of the layers of both polymeric materials;

raising the temperature of said heating element to a second temperature range within a second predetermined time period to fuse one of the remaining layers of both polymeric materials;

raising the temperature of said heating element to a third temperature range within a third predetermined time period to fuse the remaining layer of both polymeric materials; opening said first and second plates; and removing said seam fused materials.

10. The method as set forth in claim 9, including the additional steps of:

providing at least one cooling means disposed within one of said first and second plates;

lowering the temperature of said cooling means to a fourth temperature for a predetermined period of time while said first and second plates are closed.

11. The method as set forth in claim 10, including the additional steps of:

providing a first and second piece of polymeric material wherein each piece of polymeric material has a layer of polyester, a layer of high density polyethylene, and a layer of linear low density polyethylene;

providing said first temperature range from about 175° F. to about 225° F.;

providing said second temperature range from about 300° F. to about 350° F.;

providing said third temperature range of from about 350° F. to about 400° F.; and providing said fourth temperature of about 40° F.

12. The method as set forth in claim 11, including the additional steps of:

disposing one of said layers of said first polymeric material adjacent a like layer of said second polymeric material prior to the closing of said first and second plates;

providing said layer of polyester with a thickness ranging from about 0.0006 inch to about 0.0009 inch;

providing said layer of high density polyethylene with a thickness ranging from about 0.0004 inch to about 0.0006 inch; and providing said layer of linear low density polyethylene with a thickness ranging from about 0.0024 inch to about 0.0036 inch.

13. An apparatus for electronically seam fusing dissimilar polymeric materials, comprising:

a first plate having a first heating means;

a second plate spaced apart from said first plate and defining an opening therebetween for receiving like polymeric materials therein, wherein said like polymeric materials have at least two dissimilar layers of polymeric material;

means for closing said first plate on said second plate; and control means for selectively activating and cycling said first heating means to distinct temperature ranges within distinct corresponding predetermined periods of time, wherein said distinct temperature ranges and said distinct periods of time correspond to the number and type of said dissimilar layers within said like polymeric materials for the fusing of said dissimilar layers to each like dissimilar layer while said first and second plates are closed.

14. The apparatus according to claim 13, wherein said polymeric material has three dissimilar layers of polymeric material and wherein said first heating means is cycled to a first temperature range within a first predetermined period of time to fuse one of said like dissimilar layers of polymeric material, and then to a second temperature range within a second predetermined period of time to fuse one of the remaining said like dissimilar layers of polymeric materials, and then to a third temperature range within a third predetermined period of time to fuse the remaining said like dissimilar layers of polymeric material.

15. The apparatus according to claim 14, wherein said first temperature range is between 175° F. and 225° F. and said first predetermined period of time is between 0 and 0.75 second and wherein said second temperature range is between 300° F. and 350° F. and said second predetermined period of time is between 0.25 and 2.25 seconds after said first heating means is initially cycled and wherein said third temperature range is between 350° F. and 400° F. and said third predetermined period of time is between 1.75 and 3.5 seconds after said first heating means is initially cycled.

16. The apparatus according to claim 14 wherein one of said first plate and second plate receives means for cooling, wherein said control means selectively activates and cycles said cooling means to a fourth temperature any time during said predetermined periods of time.

17. The apparatus according to claim 14 wherein one of said dissimilar layers is polyester, and one of the remaining dissimilar layers is high density polyethylene and the remaining dissimilar layers is linear low density polyethylene.

* * * * *